United States Patent
Chen et al.

(10) Patent No.: US 10,390,166 B2
(45) Date of Patent: Aug. 20, 2019

(54) SYSTEM AND METHOD FOR MIXING AND ADJUSTING MULTI-INPUT AMBISONICS

(71) Applicant: QUALCOMM Incorporated, San Diego, CA (US)

(72) Inventors: Gang Chen, Tustin, CA (US); Vasudev Nayak, San Diego, CA (US); Shankar Thagadur Shivappa, San Diego, CA (US); S M Akramus Salehin, San Diego, CA (US); Nils Gunther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/714,787

(22) Filed: Sep. 25, 2017

(65) Prior Publication Data
US 2018/0352360 A1  Dec. 6, 2018

Related U.S. Application Data

(60) Provisional application No. 62/513,216, filed on May 31, 2017.

(51) Int. Cl.
*H04R 5/02* (2006.01)
*H04S 7/00* (2006.01)
*G06F 3/16* (2006.01)

(52) U.S. Cl.
CPC .............. *H04S 7/303* (2013.01); *G06F 3/165* (2013.01); *H04S 2400/11* (2013.01); *H04S 2400/13* (2013.01); *H04S 2420/11* (2013.01)

(58) Field of Classification Search
CPC .......... H04S 2420/00; H04S 2420/01; H04S 2420/03; H04S 2420/05; H04S 2420/07; H04S 2420/11; H04S 2420/13; H04S 7/30; H04S 7/301; H04S 7/302; H04S 7/303; H04S 7/304; H04S 7/305; H04S 7/306; H04S 7/40; H04S 2400/01; H04S 2400/03; H04S 2400/05; H04S 2400/07; H04S 2400/09; H04S 2400/11; H04S 2400/13; H04S 2400/15; G06F 3/16; G06F 3/162; G06F 3/165
USPC ........... 381/1–28, 61, 63, 118, 119, 123, 74; 700/94
See application file for complete search history.

(56) References Cited

U.S. PATENT DOCUMENTS

| | | | | |
|---|---|---|---|---|
| 6,021,206 A | * | 2/2000 | McGrath | H04S 3/004 381/310 |
| 6,904,152 B1 | * | 6/2005 | Moorer | H04S 5/005 381/17 |
| 9,299,353 B2 | | 3/2016 | Sole et al. | |

(Continued)

FOREIGN PATENT DOCUMENTS

| | | | | |
|---|---|---|---|---|
| CN | 106210990 A | | 12/2016 | |
| WO | WO-2016126819 A1 | * | 8/2016 | H04M 3/56 |
| WO | 2017019781 A1 | | 2/2017 | |

*Primary Examiner* — Leshui Zhang
(74) *Attorney, Agent, or Firm* — Toler Law Group, P.C.

(57) ABSTRACT

A device includes a mixer configured to mix first ambisonic data and second ambisonic data to generate mixed ambisonic data. The first ambisonic data and the second ambisonic data correspond to different spatial orders. The device also includes ambisonic adjustment circuitry configured to adjust the mixed ambisonic data based on position data to generate an adjusted mixed ambisonic output.

29 Claims, 11 Drawing Sheets

(56) References Cited

U.S. PATENT DOCUMENTS

| | | | |
|---|---|---|---|
| 2011/0316967 A1* | 12/2011 | Etter | H04N 7/142 |
| | | | 348/14.16 |
| 2013/0216070 A1* | 8/2013 | Keiler | G10L 19/008 |
| | | | 381/300 |
| 2014/0285312 A1 | 9/2014 | Laaksonen et al. | |
| 2014/0355769 A1* | 12/2014 | Peters | G10L 19/20 |
| | | | 381/23 |
| 2015/0382127 A1 | 12/2015 | Sun et al. | |
| 2016/0057556 A1* | 2/2016 | Boehm | G10L 21/02 |
| | | | 381/23 |
| 2016/0104495 A1* | 4/2016 | Peters | G10L 19/008 |
| | | | 381/22 |
| 2016/0241980 A1* | 8/2016 | Najaf-Zadeh | H04S 7/303 |
| 2018/0027351 A1* | 1/2018 | Cartwright | H04M 3/56 |
| | | | 381/303 |

\* cited by examiner

SYSTEM AND METHOD FOR MIXING AND ADJUSTING MULTI-INPUT AMBISONICS

I. CROSS-REFERENCE TO RELATED APPLICATIONS

The present application claims priority from U.S. Provisional Patent Application No. 62/513,216, filed May 31, 2017, entitled "SYSTEM AND METHOD FOR MIXING AND ADJUSTING MULTI-INPUT AMBISONICS," which is incorporated by reference in its entirety.

II. FIELD

The present disclosure is generally related to mixing and adjusting (e.g., rotating) ambisonic inputs.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Spatialized audio rendering systems output sounds that may enable user perception of a three-dimensional (3D) audio space. For example, a user may be wearing headphones, an augmented reality (AR) head mounted display (HMD), or a virtual reality (VR) HMD, and movement (e.g., translational or rotational movement) of at least a portion of the user may cause a perceived direction or distance of a sound to change. In some implementations, a spatialized audio rendering system may combine multiple ambisonic inputs to generate a spatialized audio output. To account for movement of a user and movement associated with each of the ambisonic inputs, the spatialized audio rendering system may individually adjust each of the multiple ambisonic inputs to generate multiple adjusted ambisonic inputs. After adjustment, the multiple adjusted ambisonic inputs are mixed and rendered to generate a spatialized audio signal. Such operations to generate the spatialized audio signal are computationally complex and may take a discernable amount of time, resulting in audio latency that may degrade a user experience. Additionally, the computationally complex processing may use substantial processing resources. Such processing resources may not be available in at least some electronic devices (e.g., some mobile phones), thereby limiting spatialized audio processing functionality of such devices. For example, processing resources available in some devices may not be sufficient to process a spatialized audio signal that results from individually adjusting multiple ambisonic inputs.

IV. SUMMARY

In a particular implementation, a device includes a mixer configured to mix first ambisonic data and second ambisonic data to generate mixed ambisonic data. The first ambisonic data and the second ambisonic data correspond to different spatial orders. The device also includes ambisonic adjustment circuitry configured to adjust the mixed ambisonic data based on position data to generate an adjusted mixed ambisonic output.

In another particular implementation, a method includes mixing first ambisonic data and second ambisonic data to generate mixed ambisonic data. The first ambisonic data and the second ambisonic data correspond to different spatial orders. The method also includes performing an adjustment operation on the mixed ambisonic data based on position data to generate an adjusted mixed ambisonic output.

In another particular implementation, an apparatus includes means for mixing first ambisonic data and second ambisonic data to generate mixed ambisonic data. The first ambisonic data and the second ambisonic data correspond to different spatial orders. The apparatus also includes means for adjusting the mixed ambisonic data based on position data to generate an adjusted mixed ambisonic output.

In another particular implementation, a non-transitory computer readable medium stores instructions that, when executed by a processor, cause the processor to mix first ambisonic data and second ambisonic data to generate mixed ambisonic data. The first ambisonic data and the second ambisonic data correspond to different spatial orders. The instructions further cause the processor to perform an adjustment operation on the mixed ambisonic data based on position data to generate an adjusted mixed ambisonic output.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
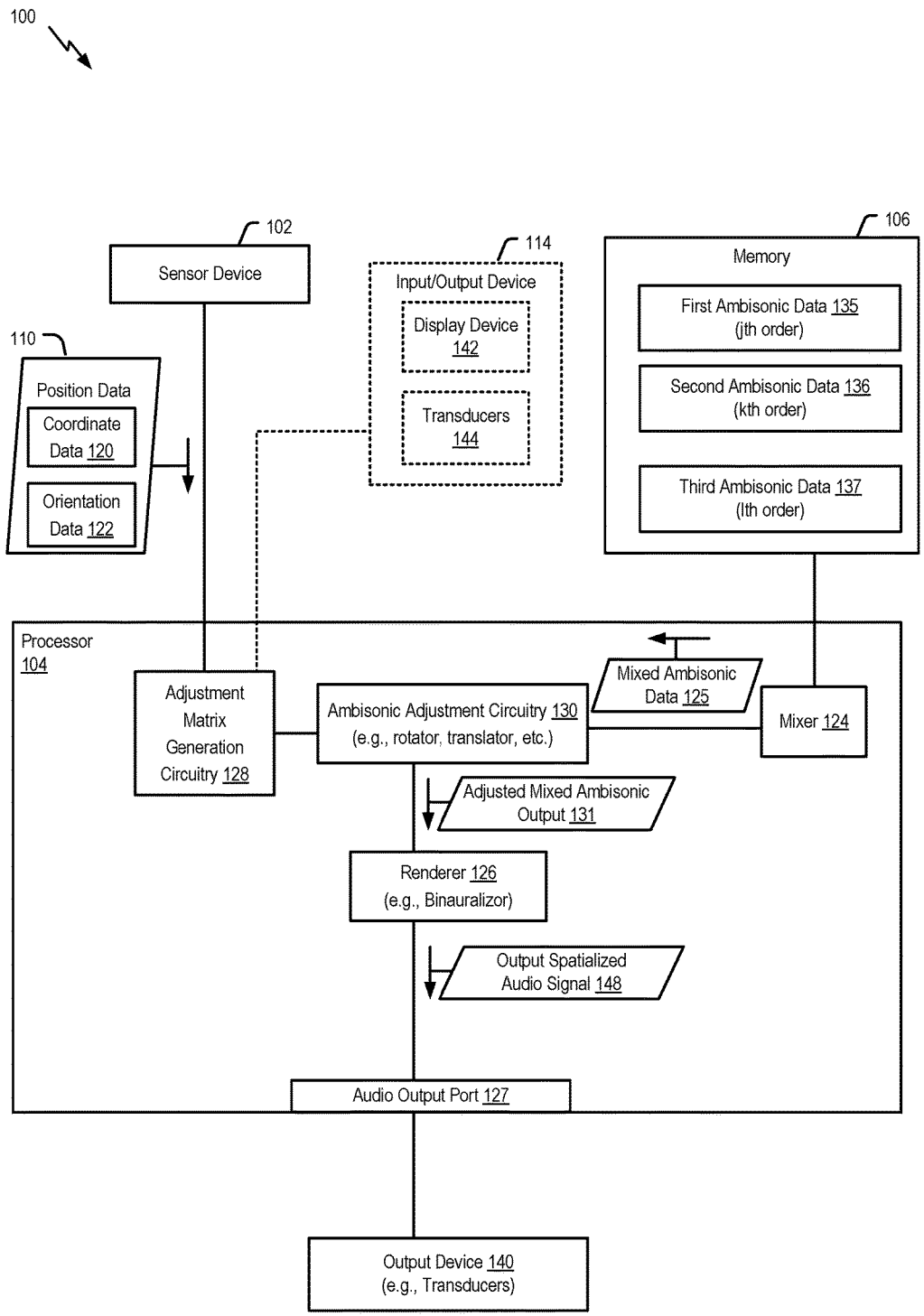
FIG. 1 is a block diagram of an illustrative example of a system configured to perform multi-input ambisonic mixing and adjustment.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

A higher-order ambisonics (HOA) signal (often represented by a plurality of spherical harmonic coefficients (SHC) or other hierarchical elements) is a three-dimensional representation of a sound field. The HOA signal, or SHC representation of the HOA signal, may represent the sound field in a manner that is independent of local speaker geometry used to playback a multi-channel audio signal rendered from the HOA signal. The HOA signal may also facilitate backwards compatibility as the HOA signal may be rendered to multi-channel formats, such as a 5.1 audio channel format or a 7.1 audio channel format, as illustrative, non-limiting examples. For example, an encoding and a subsequent decoding of the HOA signal may be adaptable and agnostic to the speaker geometry (and number) and acoustic conditions at the location of the playback (involving a renderer). The hierarchical set of elements that represent the HOA signal may refer to a set of elements in which the elements are ordered such that a basic set of lower-ordered elements provides a full representation of the modeled sound field. As the set is extended to include higher-order elements, the representation becomes more detailed, thereby increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

Systems, devices, and methods for mixing and rotating ambisonic inputs (e.g., higher-order ambisonics audio data) are disclosed. Higher-order ambisonics audio data may include at least one higher-order ambisonic (HOA) coefficient corresponding to a spherical harmonic basis function having an order greater than one.

The systems, devices, and methods described herein mix multiple ambisonic inputs to generate a mixed ambisonic input. To illustrate, a first ambisonic input and a second ambisonic input may be mixed to generate the mixed ambisonic input. The first ambisonic input and the second ambisonic may have the same spatial order or different spatial orders. For example, the first ambisonic input may correspond to a first spatial order (associated with four channels) and the second input may correspond to a second or greater spatial order.

After generating the mixed ambisonic input, the mixed ambisonic input is adjusted based on position data associated with a user. The position data may include data corresponding to a location, a translation, an orientation, a height, a speed, a velocity, an acceleration, an angular speed, or a combination thereof, of the user. Additionally, or alternatively, the position data may represent the position of a user in an AR or VR environment, and the ambisonic inputs may represent sounds in the AR or VR environment (or acoustic environment). The position data may be received from a headset, a controller (e.g., a joystick, a game controller, a keyboard, touchpad, etc.), an image capture device, or another device. In some implementations, an adjustment matrix (e.g., a rotation matrix, a translation matrix, or both) is generated based on the position data and applied to the mixed ambisonic signal. The adjustment matrix may include a matrix of coefficients configured to rotate and to translate the mixed ambisonic input based on the position data (e.g., based on user movement).

The adjusted mixed ambisonic input may be rendered to a spatialized audio output. In some implementations, the spatialized audio output is rendered to a binaural output to be output from a pair of speakers, such a pair of speakers included in a headset. As described further herein, spatialized audio signals may be rendered using three-dimensional (3D) rendering techniques to cause an output device (e.g., speakers) to output auditory sounds. As non-limiting examples, spatialized audio signals may be rendered using higher order ambisonics (HOA) techniques. Due to the 3D rendering, a user may perceive the auditory sound as being in 3D, which may enable the user to perceive direction, distance, or both of one or more sound sources corresponding to the auditory sound. For example, a user may perceive a sound of a door opening to their right (but not to their left) for an auditory sound of an opening door.

In some implementations, prior to mixing, one or more ambisonic inputs may be adjusted and the adjusted one or more ambisonic inputs may be mixed to generate the mixed ambisonic input. To illustrate, a first ambisonic input and a second ambisonic input may be received. The first ambisonic input may be adjusted to generate a rotated first ambisonic input. The adjusted first ambisonic input and the second ambisonic input are mixed to generate the mixed ambisonic input. The mixed ambisonic input may be adjusted based on position data and rendered to generate a spatial audio signal. The adjustment of an individual ambisonic input may be independent of a user (e.g., a listener), such that a perceived direction of a first sound source (e.g., a bird) corresponding to a first ambisonic input may change while perceived direction of a second sound source (e.g., a waterfall) corresponding to a second ambisonic input may appear to be stationary.

The systems, devices, and methods described herein may enable processing of spatialized audio signals using fewer processing resources than other techniques. The disclosed techniques enable processing of spatialized audio signals using devices that would otherwise lack sufficient processing resources to process spatialized audio signals. Thus, multimedia applications, such as virtual reality (VR) applications and augmented reality (AR) applications, may be enabled on a wider variety of devices, such as mobile devices and vehicles (e.g., smart cars, autonomous vehicles, etc.).

FIG. 1 illustrates a system 100 for processing spatialized audio signals. The system 100 may adjust or modify spatialized audio signals to rotate and reposition a sound field (or audio objects/sounds sources thereof). The sound field may be associated with a virtualized environment. As described further herein, spatialized audio signals may be rendered using three-dimensional (3D) rendering techniques to cause output of auditory sounds. As a non-limiting example, spatialized audio signals may be rendered using higher order ambisonics (HOA) techniques. Due to the 3D rendering, a user may perceive the auditory sound as being in 3D, which may enable the user to perceive direction, distance, or both of one or more sound sources corresponding to the auditory sound. For example, a user may perceive a sound of a door opening to their right (but not to their left) for an auditory sound of an opening door.

Spatialized audio refers to the capture and reproduction of audio signals in a manner that preserves or simulates location information of audio sources in an audio scene (e.g., a 3D audio space). To illustrate, upon listening to playback of a spatial audio signal, a listener is able to perceive a relative location of various audio sources in the audio scene relative to each other and relative to the listener. One format for creating and playing back spatial audio signals is channel based surround sound format. In a channel based surround sound system, loudspeaker feeds are adjusted to create a reproduction of the audio scene. Another format for spatial audio signals is object-based audio. In object-based audio, audio objects are used to create spatial audio signals. Each audio object is associated with 3D coordinates (and other metadata), and the audio objects are simulated at the playback side to create perception by a listener that a sound is originating from a particular location of an audio object.

An audio scene may consist of several audio objects. Object-based audio is used in multiple systems, including video game systems. Higher order ambisonics (HOA) is another format for spatialized audio signals. HOA is used to capture, transmit and render spatial audio signals. HOA represents an entire sound field in a compact and accurate manner and aims to recreate the actual sound field of the capture location at the playback location (e.g., at an audio output device). HOA signals enable a listener to experience the same audio spatialization as the listener would experience at the actual scene. In each of the above formats (e.g., channel based audio, object-based audio, and HOA-based audio), multiple transducers (e.g., loud speakers) are used for audio playback. If the audio playback is to be output by headphones, additional processing (e.g., binauralization) is performed to generate audio signals that "trick" the listener's brain into thinking that the sound is actually coming from different points in the space rather than from the transducers in the headphones.

The system 100 includes a sensor device 102, a processor 104, a memory 106, and an output device 140 (e.g., transducers). The sensor device 102 may be coupled to the processor 104. As used herein, "coupled" may include "communicatively coupled," "electrically coupled," or "physically coupled," and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The sensor device 102 may be configured to generate position data 110 and to send the position data 110 to the processor 104. For example, the position data 110 may be indicative of a position (or movement) of a user. The position (or movement) of the user may correspond to or represent a position of the user in a virtual environment (e.g., a virtualized environment). The sensor device 102 may include motion or movement sensors, such as an infrared sensor, an accelerometer, a gyro sensor, an orientation sensor, a linear position sensor, a proximity sensor, a motion sensor, an angular position sensor, a global positioning system (GPS) sensor, an ultrasound sensor, a camera or other imaging device, or a combination thereof. Additionally, or alternatively, the sensor device 102 may include sensors of a user input device, such as a controller, a joystick, a touch screen, a keyboard, a mouse, a voice input system, or another user input device.

In some implementations, the position data 110 may be generated based on user input. For example, the position data 110 may be generated based on capturing or receiving the user input. For example, an infrared sensor, an imaging device, or both, may capture physical movement of the user, gestures of the user, or both, and may generate the position data 110 data based on the movement, gestures, or both. As another example, a gyroscope, a controller (e.g., a game pad), or both, may generate sensor data based on a received user input (e.g., depressing a button, moving a joystick, performing a touch gesture, etc.), or both, and may generate the position data 110 based on the sensor data.

The position data 110 may include data corresponding to a location, a translation, a rotation, an orientation, a height, a speed, a velocity, an acceleration, an angular speed, or a combination thereof, of the user in a virtualized environment. The virtual environment may be associated with an audio/visual program, such as a virtual reality game, a movie, an interactive application, a video conferencing application, a vehicle control application, or another application or program.

The memory 106 may be coupled to the processor 104 and may be configured to store data, such as spatialized audio signal data. For example, the memory 106 may store ambisonic data, such as first ambisonic data 135, second ambisonic data 136, and third ambisonic data 137. In some implementations, the ambisonic data 135-137 is formatted in accordance with a high order ambisonic (HOA) format. For example, the ambisonic data 135-137 may include data corresponding to directional information of a 3D sound field. As illustrative, non-limiting examples, the ambisonic data 135-137 may include data corresponding to one or more channels or may include data corresponding to one or more objects.

The first ambisonic data 135 corresponds to a first ambisonic input (a first spatialized audio signal), the second ambisonic data 136 corresponds a second ambisonic input (a second spatialized audio signal), and the third ambisonic data 137 corresponds to a third ambisonic input (a third spatialized audio signal). The ambisonic data stored at the memory 106 may be associated with a corresponding spatial order. In some implementations, the ambisonic data 135-137 corresponds to different spatial orders. As an illustrative, non-limiting example, the first ambisonic data 135 may be associated with a fourth spatial order, the second ambisonic data 136 may be associated with a first spatial order, and the third ambisonic data 137 may be associated with a third spatial order. As another example, the first ambisonic data 135 corresponds to a higher spatial order than the second ambisonic data 136. Alternatively, some of the ambisonic data 135-137 may correspond to the same order. For example, the first ambisonic data 135 and the third ambisonic data 137 may correspond to the same spatial order. In a particular implementation, the system 100 supports ambisonic inputs having up to the sixth spatial order.

In some implementations, the ambisonic data 135-137 may be stored as part of an audio/visual program at the memory 106. In other implementations, the ambisonic data 135-137 may be received from another device, such as a server that is communicatively coupled to the system 100 via a network, and the ambisonic data 135-137 may not be stored at the memory 106 (or may be temporarily stored, such as at a volatile portion of the memory 106). In some implementations, the memory 106 may be configured to store local ambisonic data that may be mixed with the ambisonic data 135-137, as further described with reference to FIG. 8.

In some implementations, the memory 106 further stores an audio/visual program (not shown). The audio/visual program may be associated with the ambisonic data 135-137. For example, the ambisonic data 135-137 may represent multiple sound sources of a sound field corresponding to the virtual environment. To illustrate, the ambisonic data 135-137 may represent sounds of a dog barking, an ambulance siren, and a car engine when the virtual environment is an urban environment. Additionally, or alternatively, the virtual environment may represent indoor environments (e.g., an interior region), other outdoor environments (e.g., an outdoor region), or both. The virtual environment may include or correspond to a virtual reality environment, an augmented reality environment, or another visually perceivable environment.

The processor 104 may be configured to generate output spatialized audio signals (e.g., an output spatialized audio signal 148) that account for movement of a user in an audio/visual environment (e.g., a virtualized environment). The output spatialized audio signals may be generated by modifying input spatialized audio signals, such as the ambisonic data 135-137, as further described herein. The processor 104 may include a mixer 124, a renderer 126, adjustment matrix generation circuitry 128, and ambisonic adjustment circuitry 130. In a particular implementation, the processor 104 is integrated in a wearable multimedia display device, such as a head-mounted display (HMD) of a virtual reality or augmented reality device. Additionally, or alternatively, the processor 104 may be integrated in a mobile communication device.

The mixer 124 is configured to mix ambisonic input signals. For example, the mixer 124 may receive the first ambisonic data 135 (corresponding to a first ambisonic input) and the second ambisonic data 136 (corresponding to a second ambisonic input), and the mixer 124 may mix the first ambisonic data 135 and the second ambisonic data 136 to generate mixed ambisonic data 125. In some implementations, the mixer 124 is further configured to mix the third ambisonic data 137 with the first ambisonic data 135 and the second ambisonic data 136 to generate the mixed ambisonic data 125. In some implementations, the mixer 124 is configured to mix up to eight or more ambisonic inputs to generate the mixed ambisonic data 125. The mixer 124 may provide the mixed ambisonic data 125 to the ambisonic adjustment circuitry 130. Operation of the mixer 124 is described further herein with reference to FIG. 3.

The adjustment matrix generation circuitry 128 is configured to generate an adjustment matrix based on the position data 110. The adjustment matrix may include rotation coefficients, translation coefficients, or a combination thereof. In a particular implementation, the coefficients include higher order ambisonic (HOA) coefficients. In a particular implementation, the adjustment matrix may include coefficients associated with pitch, yaw, and roll angles. Additionally, or alternatively, the adjustment matrix may include coefficients associated with x, y, and z coordinates. In some implementations, the adjustment matrix generation circuitry 128 may be configured to select, based on the position data 110 (or other position data), an adjustment matrix from a plurality of adjustment matrices stored at the memory 106.

A size of an adjustment matrix may correspond to an ambisonic order (e.g., a number of signal or directional components, also referred to as a spatial order) of the mixed ambisonic data 125. For example, if the mixed ambisonic data 125 corresponds to a 4th order ambisonic signal that includes 25 signal or directional components, the adjustment matrix may include 25 coefficients (e.g., the adjustment matrix may be a 5×5 matrix of coefficients). In some implementations, prior to generating the mixed ambisonic data 125, a gain compensation operation may be performed on one or more ambisonic inputs (e.g., on the first ambisonic data 135), as described with reference to FIG. 3. The gain compensation operation may be performed to substantially match gains (e.g., amplitudes or signal level) between multiple ambisonic inputs. For example, if the gain of the ambisonic input corresponding to the second ambisonic data 136 is greater than the gain of the ambisonic input corresponding to the first ambisonic data 135, the gain compensation operation may be based on a spatial order associated with the first ambisonic data 135 and may modify or adjust (e.g., increase) the gain of the ambisonic input corresponding to the first ambisonic data 135 to substantially match the gain of the ambisonic input corresponding to the second ambisonic data 136.

In some implementations, prior to generating the mixed ambisonic data 125, the first ambisonic data 135 may be adjusted based on ambisonic input movement data associated with the first ambisonic data 135, as described with reference to FIG. 2. For example, the ambisonic input movement data may be associated with perceived movement of a sound source (that corresponds to an ambisonic input) within an audio/visual environment (e.g., a virtualized environment). The perceived movement of the sound source may be independent of movement (e.g., the position data 110) associated with user movement. To illustrate, a sound source (that corresponds to an ambisonic input, such as the first ambisonic data 135) may be associated with a bird having movement in the audio/visual environment (e.g., a virtualized environment) from left to right with respect to a user that is assumed to be stationary.

The ambisonic adjustment circuitry 130 is configured to adjust the mixed ambisonic data 125 based on the position data 110 (e.g., the adjustment matrix) to generate an adjusted mixed ambisonic output 131. In a particular implementation, the ambisonic adjustment circuitry 130 is configured to perform the adjustment operation to generate the adjusted mixed ambisonic output 131. For example, the ambisonic adjustment circuitry 130 may perform the adjustment operation using the adjustment matrix to generate the adjusted mixed ambisonic output 131. The adjustment operation may include a rotation operation, a translation operation, or a combination thereof.

The renderer 126 is configured to receive the adjusted mixed ambisonic output 131 and to generate the output spatialized audio signal 148 (e.g., a spatialized audio signal). In some implementations, the output spatialized audio signal 148 represents audio content associated with the audio/visual program. The renderer 126 may provide the output spatialized audio signal 148 to an output device 140 via an audio output port 127. In some implementations, the system 100, such as the processor 104 (e.g., the renderer 126), may include a binauralizor and a digital to analog converter to process the output spatialized audio signal 148 prior to the output spatialized audio signal 148 being provided to the audio output port 127.

The processor 104 may include the audio output port 127 coupled to the renderer 126. Although the audio output port 127 is depicted as being included in the processor 104, in other implementations, the audio output port 127 may external to and coupled to the processor 104. The audio output port 127 may be configured to receive the output spatialized audio signal 148 and to transmit or provide the output spatialized audio signal 148 to the output device 140 (e.g., an external audio output device). For example, the processor 104 may transmit the output spatialized audio signal 148 to the output device 140 via the audio output port 127. As illustrative, non-limiting examples, the audio output port 127 may include or correspond to a 3.5 millimeter (mm) stereo port (e.g., an audio jack), a universal serial bus (USB) port, another port, or a combination thereof. The output device 140 (e.g., an external audio output device) may include or correspond to one or more speakers, a speaker bar, a surround sound system, headphones, or a combination thereof. In a particular implementation, the output device 140 includes at least two speakers configured to generate an audio output representation of the output spatialized audio signal 148.

In some implementations, the system 100 may include an input/output (I/O) device 114 coupled to the processor 104. The input/output device 114 may include a display device 142, one or more transducers 144, or a combination thereof. The display device 142 may be coupled to the processor 104 and may be configured to display visual content associated with an audio/visual program. For example, the display device 142 may display the virtual environment of the audio/visual program. The display device 142 may be configured to display content associated with a multimedia program, to receive user inputs, or both.

The input/output device 114 may include the sensor device 102 or may be distinct from the sensor device 102. For example, the sensor device 102 may include or correspond to a headset and the input/output device 114 may include or correspond to a camera or a game control device. The input/output device 114 may be configured to provide corresponding position data to the processor 104 (e.g., the adjustment matrix generation circuitry 128), as described with reference to FIG. 4. Additionally, or alternatively, the input/output device 114 may include or correspond to the output device 140. For example, the output device 140 may be included in the input/output device 114 as transducers 144.

To illustrate, in some implementations, the display device 142 may be a head mounted display (HMD), as described with reference to FIG. 4. In other implementations, the display device 142 may be a projection device configured to project a 3D image of the virtual environment, as described with reference to FIG. 5. In some implementations, the display device 142 may be included in a component of a vehicle, as described with reference to FIG. 6. For example, the display device 142 be integrated in a windshield of an automobile and may display the virtual environment or may project the virtual environment (e.g., a visual environment) on the windshield.

In some implementations, the system 100 may include a network interface (not shown) coupled to the processor 104. The network interface may be configured to send and receive data. For example, the network interface may receive the ambisonic data 135-137, the audio/visual program, the position data 110, or a combo thereof. The network interface may send the output spatialized audio signal 148 (and video data indicative) of the virtual environment to external output devices, such as the output device 140 or the input/output device 114. The network interface may include or correspond to a wired interface, a wireless interface, or both. The network interface is described further with reference to FIG. 4.

During operation, a user may input a command to the system 100 to begin the audio/visual program, and the processor 104 may execute and the audio/visual program. For example, the processor 104 may initiate playback of one or more spatialized audio signals (e.g., the ambisonic data 135-137). Audio signals may be output via the output device 140 (or via the one or more transducers 144). The system 100 may process the ambisonic data 135-137 based on user movement (e.g., the position data 110) received from the sensor device 102 to generate the output spatialized audio signal 148. In a particular implementation, the output spatialized audio signal 148 may include or correspond to a fourth order HOA signal or higher than a fourth order HOA signal.

To illustrate, the user may change positions in a physical environment and may rotate their head, and the sensor device 102 may receive the user movement as inputs and generate the position data 110. The position data 110 may include data corresponding to a location, a translation, an orientation, a height, a speed, a velocity, an acceleration, an angular speed, or a combination thereof, of the user. Additionally, or alternatively, the position data 110 may represent the position of a user in an AR or VR environment, and ambisonic inputs (e.g., the ambisonic data 135-137) may represent sounds in the AR or VR environment (or acoustic environment). The position data 110 may be received from a headset, a controller (e.g., a joystick, a game controller, a keyboard, touchpad, etc.), an image capture device, or another device.

In some implementations, based on the position data 110, the processor 104 (e.g., the adjustment matrix generation circuitry 128) may generate an adjustment matrix that is provided to the ambisonic adjustment circuitry 130. The adjustment matrix may include a matrix of coefficients configured to rotate and to translate the mixed ambisonic data 125 based on the position data 110 (e.g., based on user movement).

The processor 104 may mix multiple ambisonic inputs to generate the mixed ambisonic data 125. For example, the processor 104 (e.g., the mixer 124) may mix a first ambisonic input (e.g., the first ambisonic data 135) and a second ambisonic input (e.g., the second ambisonic data 136) to generate a mixed ambisonic input (e.g., the mixed ambisonic data 125). The first ambisonic input and the second ambisonic may have the same spatial order or different spatial orders. For example, the first ambisonic input may correspond to a first spatial order (associated with four channels) and the second input may correspond to a second or greater spatial order (associated with five or more channels).

The processor 104 may modify the mixed ambisonic data 125 by applying the adjustment matrix (e.g., one or more rotation matrices, one or more translation matrices, or both) to the mixed ambisonic data 125 to generate the adjusted mixed ambisonic output 131. The adjustment matrix may include a matrix of coefficients configured to rotate and translate the sound field represented by the mixed ambisonic data 125 based on the position data 110 (e.g., based on user movement). For example, the adjustment matrix may rotate the sound field to account for head rotation of the user and may translate the sound field to account for translation of the user from a first position to a second position in the virtual environment.

The processor 104 may render an adjusted mixed ambisonic input (e.g., the adjusted mixed ambisonic output 131) to a spatialized audio output (e.g., the output spatialized audio signal 148). In some implementations, the spatialized audio output is rendered to a binaural output to be output from a pair of speakers, such a pair of speakers included in a headset. As described further herein, spatialized audio signals may be rendered using 3D rendering techniques to cause an output device (e.g., speakers) to output auditory sounds.

In some implementations, the system 100 may provide the output spatialized audio signal 148 (e.g., spatialized audio signals) to an audio device, such as the output device 140, that generates audio outputs (e.g., auditory sounds) for a user. In a particular implementation, the system 100 may be integrated in a virtual reality (VR) system or augmented reality (AR) system. The audio outputs may be 3D audio outputs that enable a user to perceive a direction or a distance of sounds in a 3D audio space relative to a location of a user, either in a game (or other virtual reality environment) or in reality. For example, if the user is playing a game and a car drives to the left of the user in the game, the audio output enables the user to perceive a sound of a car as coming from the user's left side. If the user turns to the right in the game such that the car is behind the user, the system 100 processes the spatialized audio signal to cause the audio output to change such that the user experiences the sound of the car as coming from behind the user.

To further illustrate, the system 100 (e.g., the processor 104) may receive the position data 110 from the sensor device 102 (or position data from the input/output device 114) that is configured to track the position and orientation of a user (or of an audio device worn by the user), or to track the position, orientation, or rotation of the user in a virtual environment. For example, the system 100 (e.g., the processor 104) may receive position data from one or more location sensors, one or more motion sensors, or a combination thereof, that are integrated within a HMD of a VR system. As another example, the system 100 (e.g., the processor 104) may receive position data from one or more cameras or other optical sensors that track a position and orientation of a user. As another example, the system 100 (e.g., the processor 104) may receive position data from a controller of a VR system, a gesture capture device, a motion capture device, or some other means of control for a VR system or an AR system.

In some implementations, the system 100 may correspond to a device, such as a multimedia device. The device may include or correspond to a portable personal computing device, such as a mobile phone or a tablet, as illustrative, non-limiting examples. In a particular implementation, the system 100 (e.g., the processor 104) is coupled to the audio device. For example, the system 100 (e.g., the processor 104) may be a mobile telephone that is communicatively coupled to the audio device (e.g., the HMD, a headset, a speaker array, etc.). In another particular implementation, the system 100 (e.g., the processor 104) is integrated within the audio device.

In the above description, various functions performed by the system 100 of FIG. 1 are described as being performed by certain components. However, this division of components is for illustration only. In an alternate implementation, a function described herein as performed by a particular component may instead be divided amongst multiple components. Moreover, in an alternate implementation, two or more components of FIG. 1 may be integrated into a single component. For example, the processor 104 and the mixer 124 may be integrated in a single component. Alternatively, the sensor device 102 and the processor 104 may be integrated in a single component. Each component illustrated in FIG. 1 may be implemented using hardware (e.g., a field-programmable gate array (FPGA) device, an application-specific integrated circuit (ASIC), a DSP, a controller, etc.) or a combination of hardware and software.

The systems, devices, and methods described herein enable processing of spatialized audio signals by mixing multiple ambisonic inputs and adjusting the mixed multiple ambisonic inputs. Mixing the ambisonic inputs prior to adjusting the mixed ambisonic input may use fewer processing resources than other techniques, such as adjusting each individual ambisonic input and then mixing the adjusted ambisonic inputs. Thus, the disclosed techniques improve the operation of computing devices by improving the efficiency of ambisonic input processing (e.g., reducing processing time and power consumption associated with processing the ambisonic inputs). Because fewer processing resources are used (e.g., the complexity of processing spatialized audio signals is reduced), the disclosed techniques enable processing of spatialized audio signals using devices that would otherwise lack sufficient processing resources to process spatialized audio signals. Thus, multimedia applications, such as VR applications and AR applications, may be enabled on a wider variety of devices, such as mobile devices and vehicles (e.g., smart cars, autonomous vehicles, etc.).

Figure 2:
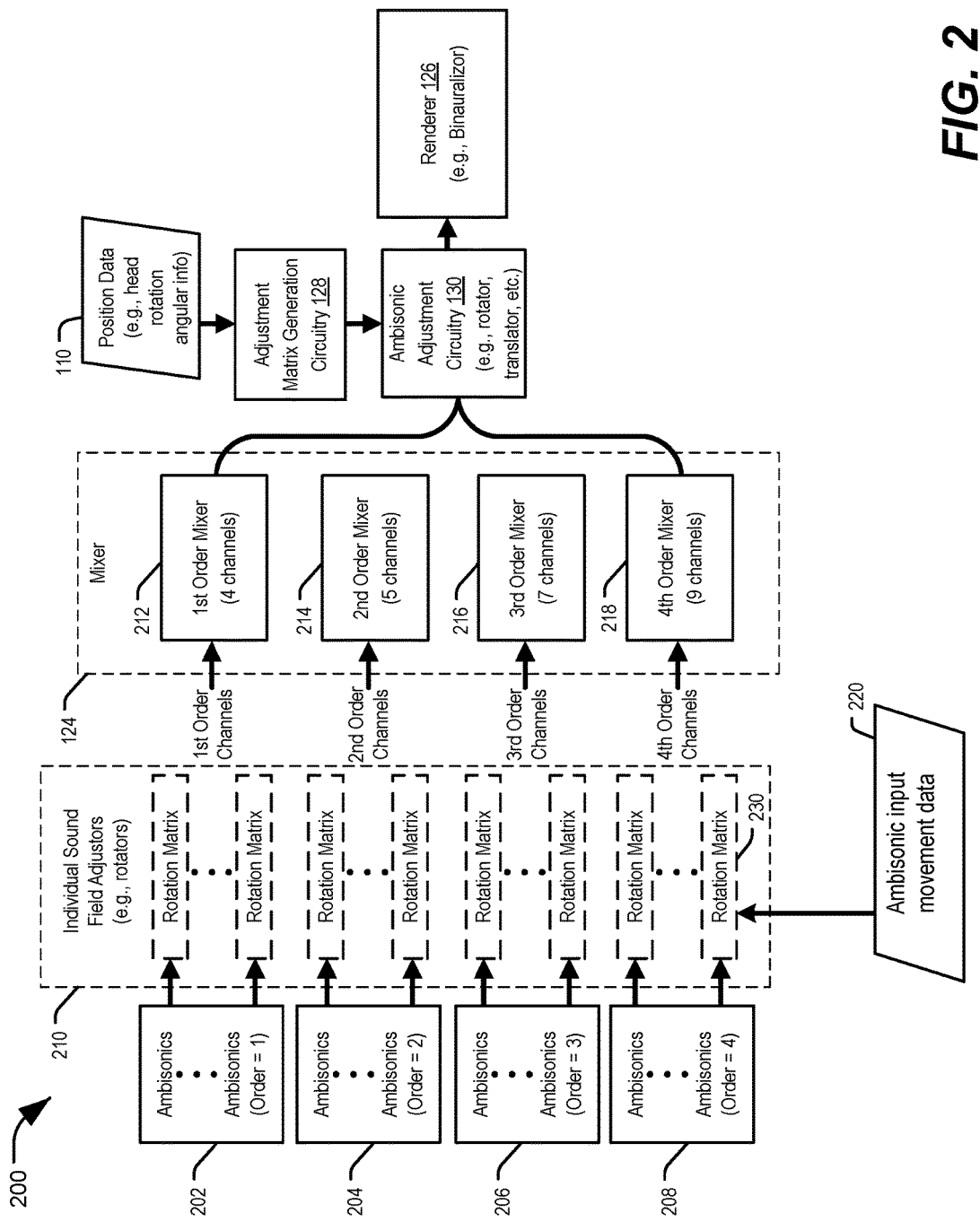
FIG. 2 is a diagram illustrating of an example of ambisonic processing.

Referring to FIG. 2, a block diagram to illustrate an aspect of the system 100 that generates spatialized audio signals based on multi-input ambisonic mixing and adjustment is depicted and generally designated 200. The block diagram 200 includes ambisonics inputs 202-208, individual sound field adjustors 210 (e.g., rotators), the mixer 124, the adjustment matrix generation circuitry 128, the ambisonic adjustment circuitry 130, and the renderer 126.

The ambisonics inputs 202-208 include one or more first ambisonics inputs 202 having a first spatial order, one or more second ambisonics inputs 204 having a second spatial order, one or more third ambisonics inputs 206 having a third spatial order, and one or more fourth ambisonics inputs 208 having a fourth spatial order. The ambisonics inputs 202-208 may include or correspond to the ambisonic data 135-137 of FIG. 1.

Each of the one or more first ambisonics inputs 202 may be associated with a first number of channels (e.g., four channels) corresponding to the first spatial order. Each of the one or more second ambisonics inputs 204 may be associated with a second number of channels (e.g., five channels) corresponding to the second spatial order. Each of the one or more third ambisonics inputs 206 may be associated with a third number of channels (e.g., seven channels) corresponding to the third spatial order. Each of the one or more fourth ambisonics inputs 208 may be associated with a fourth number of channels (e.g., nine channels) corresponding to the fourth spatial order.

Two or more of the ambisonics inputs 202-208 may be provided to the mixer 124. The mixer 124 may be configured to mix channels of the two or more of the ambisonics inputs 202-208 to generate a mixed ambisonic input (e.g., the mixed ambisonic data 125). For example, the mixer 124 may include a first mixer 212 (e.g., a first order mixer) configured to mix the first number of channels, a second mixer 214 (e.g., a second order mixer) configured to mix the second number of channels, a third mixer 216 (e.g., a third order mixer) configured to mix the third number of channels, and a fourth mixer 218 (e.g., a fourth order mixer) configured to mix the fourth number of channels. Operations performed by the mixer 124 to mix the two or more of the ambisonics inputs 202-208 are described further herein with reference to FIG. 3.

The individual sound field adjustors 210 may include a plurality of ambisonic adjustors (e.g., ambisonic adjustment circuitry) that are each configured to apply a corresponding adjustment matrix (e.g., a rotation matrix, a translation matrix, or a combination thereof) to a particular ambisonic input. For example, a representative sound field adjustor 230 may be configured to adjust a particular ambisonic input having a fourth spatial order. In some implementations, prior to generating the mixed ambisonic data 125, at least one of the two or more of the ambisonics inputs 202-208 provided to the mixer 124 may be adjusted based on movement data, such as ambisonic input movement data 220.

The ambisonic input movement data 220 may be associated with perceived movement of a sound source (that corresponds to an ambisonic input) within an audio/visual environment (e.g., a virtualized environment). The perceived movement of the sound source is independent of movement (e.g., the position data 110) associated with user movement. To illustrate, a sound source (that corresponds to an ambisonic input) may be associated with a bird having movement in the audio/visual environment (e.g., a virtualized environment) from left to right with respect to a stationary user (e.g., no translational or rotational movement).

Individual adjustment (independent of user movement) of ambisonic inputs may occur less frequently than adjustment based on user movement (e.g., the position data 110). Accordingly, in some implementations, no ambisonic inputs are adjusted prior to being provided to the mixer 124. In such implementations, the individual sound field adjustors 210 may be bypassed and the multiple ambisonic inputs may be provided directly to the mixer 124. In other implementations, one or more of the ambisonic inputs provided to the mixer 124 are adjusted prior to being received by the mixer 124. Accordingly, the system of FIG. 2 provides ambisonic inputs to be individually adjusted on an as needed basis.

Figure 3:
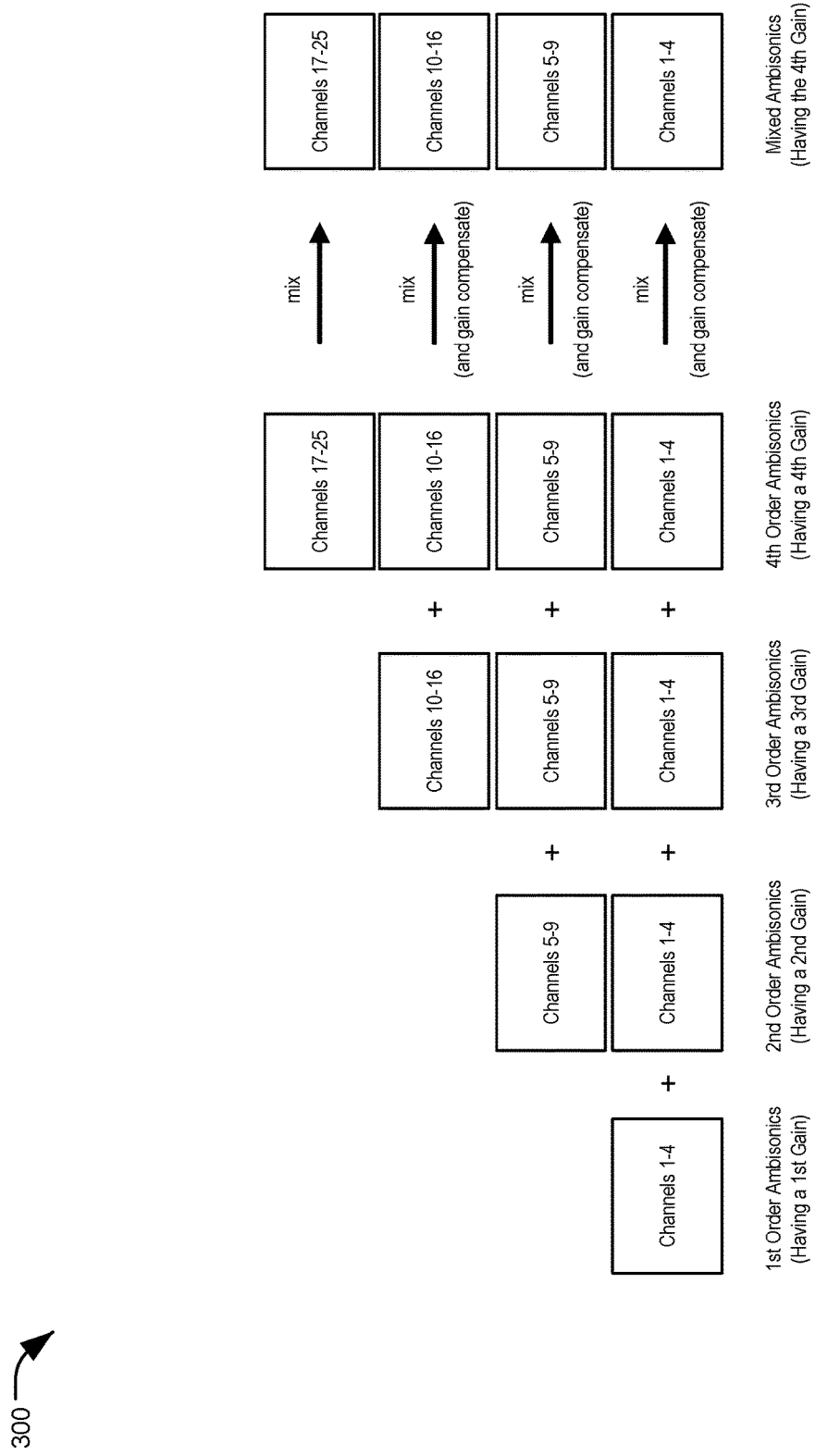
FIG. 3 is a diagram illustrating an example of mixing ambisonic inputs.

Referring to FIG. 3, a diagram illustrating a mixing operation performed by the mixer 124 is depicted and generally designated 300. As depicted in FIG. 3, four ambisonic inputs are mixed to generate a mixed ambisonic input (e.g., the mixed ambisonic data 125). For example, a first ambisonic input (e.g., the first order ambisonics), a second ambisonic input (e.g., the second order ambisonics), a third ambisonic input (e.g., the third order ambisonics), and a fourth ambisonic input (e.g., the fourth order ambisonics) are mixed to generate a mixed ambisonic input, such as the mixed ambisonic data 125. The mixed ambisonic input may have a spatial order that corresponds to a highest spatial order of the multiple ambisonic inputs. For example, in FIG. 3, the mixed ambisonic input has fourth order ambisonics because the fourth order is the highest order of the multiple ambisonic inputs. In some implementations, the first ambisonic input includes or corresponds to the first ambisonic data 135 and the second ambisonic input corresponds to the second ambisonic data 136.

In some implementations, prior to generating the mixed ambisonic input (e.g., the mixed ambisonic data 125), a gain compensation operation may be performed on one or more ambisonic inputs. The gain compensation may be performed to substantially match gains (e.g., amplitudes or signal levels) between the multiple ambisonic inputs. For example, if the gain of the first ambisonic input (e.g., the first order ambisonics) is different from the gain of the third ambisonic input (e.g., the third order ambisonics), the gain compensation operation may be based on a spatial order of the first ambisonic input and may adjust or modify (e.g., increase) the gain of the first ambisonic input to substantially match a gain of the third ambisonic input. For example, if the first ambisonic input has a first gain and the third ambisonic input has a third gain that is greater than the first gain (based on the third order being higher than the first order), the gain compensation operation may increase the first gain to substantially match the third gain. Additionally, or alternatively, the gain of the third ambisonic input may be modified or adjusted to match the gain of the first ambisonic input. For example, the third gain may be decreased to substantially match the first gain. In a particular implementation illustrated in FIG. 3, the gains of the first ambisonic input, the second ambisonic input, and the third ambisonic input may be adjusted to substantially match the gain of the fourth ambisonic input prior to mixing. After the gain compensation operation(s) are performed, the ambisonic inputs are mixed to generate a mixed ambisonic output (e.g., the mixed ambisonic data 125).

Figure 4:
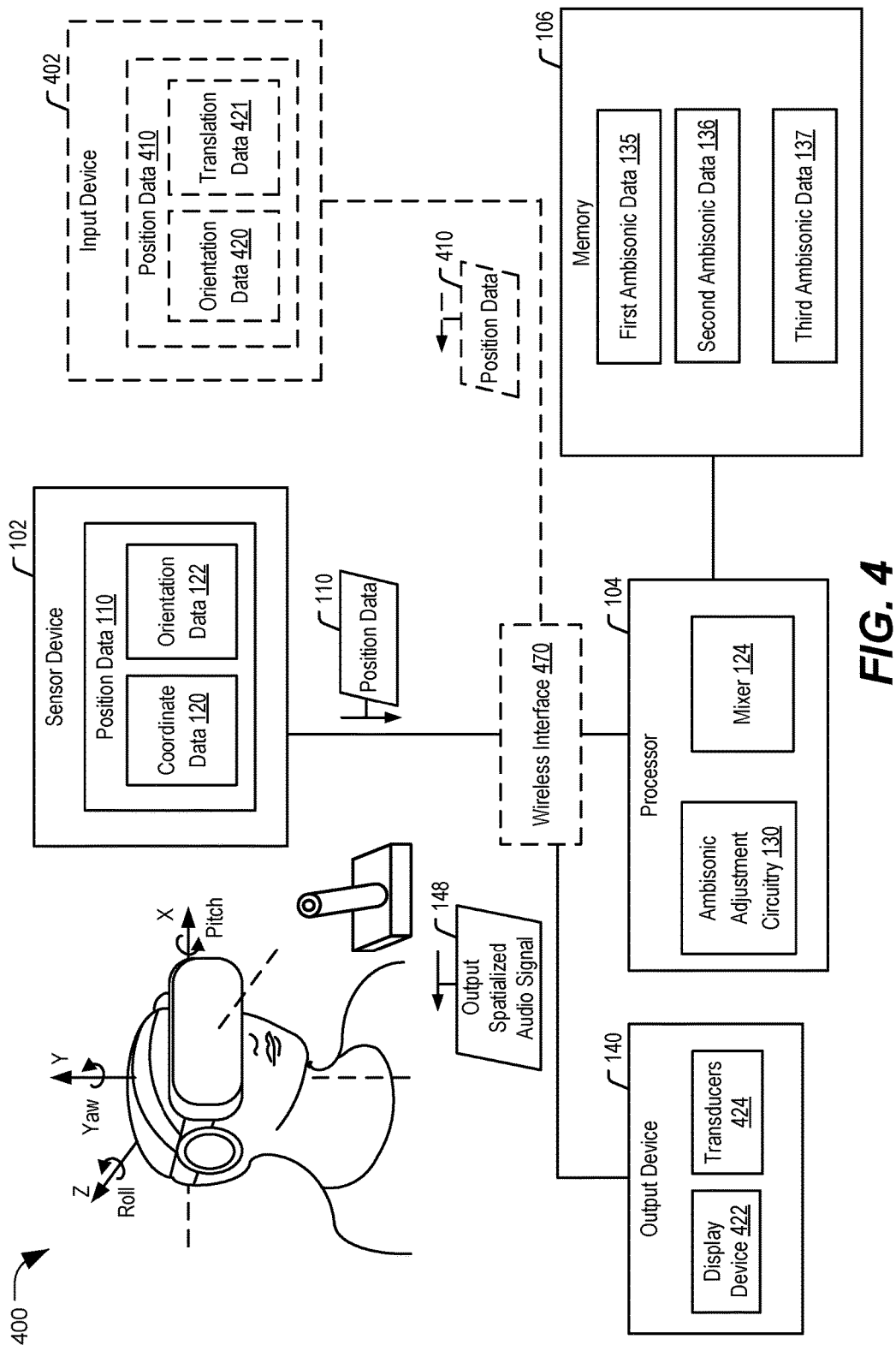
FIG. 4 illustrates a block diagram of an aspect of a system that generates spatialized audio signals based on multi-input ambisonic mixing and adjustment.

Referring to FIG. 4, a block diagram of an aspect of a system that generates spatialized audio signals based on based on multi-input ambisonic mixing and adjustment is shown and generally designated 400. The system 400 includes the sensor device 102, the processor 104, the memory 106, and the output device 140. In some implementations, the system 400 may include an input device 402 and a wireless interface 470. The input device 402 may include or correspond to the input/output device 114 of FIG. 1. In some implementations, the input device 402 and the output device 140 may include in the same device. In a particular implementation, the processor 104, the memory 106, the input device 402, the wireless interface 470, and the output device 140 are integrated into a single device. In other implementations, one or more of the processor 104, the memory 106, the input device 402, and the output device 140 are distinct (e.g., integrated into different devices) and coupled (e.g., wirelessly coupled) to the other components of the system 400. Thus, the system 400 may be a distributed system.

The processor 104 may be coupled to the memory 106. The sensor device 102, the input device 402, and the output device 140 may be coupled to the processor 104. In a particular implementation, the sensor device 102 (e.g., one or more sensor devices), the input device 402, and the output device 140 are wirelessly coupled to the processor 104, such as via the wireless interface 470. For example, the sensor device 102, the input device 402, and the output device 140 may be configured to wirelessly transmit data to, or wirelessly receive data from, the processor 104.

In FIG. 4, the system 400 includes or corresponds to a virtual reality system. The virtual reality system may include a HMD and a headset (e.g., a pair of headphones). The HMD and the headset may be referred to as a wearable multimedia display device. Thus, the processor 104, the sensor device 102, the output device 140 that includes the display device 422, and at least two speakers (e.g., transducers 424) may be integrated in a wearable multimedia display device. The HMD may include a display screen (or multiple display screens, such as two display screens in a pair of eyepieces) that is configured to display a virtual environment to the user. The headset may be configured to generate a spatialized audio output associated with the virtual environment. To illustrate, the system 400 may be configured to play a video game, the HMD may be configured to display a virtual environment of the video game, and the headset may be configured to playback spatialized audio associated with the video game. As another example, the system 400 may be configured to view a movie or other multimedia program (e.g., audio/visual program), the HMD may be configured to display a virtual environment associated with the movie, and the headset may be configured to playback spatialized audio corresponding to an audio track of the movie.

The sensor device 102 may be configured to generate the position data 110. For example, the sensor device 102 may include an accelerometer, a gyro sensor, an orientation sensor, a linear position sensor, a proximity sensor, a motion sensor, an angular position sensor, a global positioning system (GPS) sensor, an ultrasound sensor, any other sensor(s) capable of determining a translational position or a coordinate position (e.g., a location in a coordinate space, such as x-y-z coordinates) of the system 400, an orientation (e.g., pitch, yaw, and roll angles) of the system 400, or a combination thereof. The sensor device 102 may be affixed to or integrated in the system 400.

In some implementations, the system 400 may be worn on the user's head, and, thus, the position data 110 may represent the position (e.g., translation, orientation, rotation, etc.) of the user or the user's head. For example, the user may navigate the virtual environment by moving (e.g., translating) or by orienting (rotating) his or her head. The user's translation and head orientation may be mapped to a translation and an orientation in the virtual environment. For example, when the user takes a step forward and turns her head to the left, navigation in the virtual environment may include a forward translation and an orientation to the left. Additionally, the user may turn the user's head to the left, right, upward, downward, or a combination thereof.

The position data 110 includes coordinate data 120 and orientation data 122. As illustrated in FIG. 4, the coordinate data 120 may include x-y-z coordinates (e.g., translational position data) that indicate a translational position of the user (or the system 400). In some examples, the translational position of the user may be relative to a fixed origin, such as the center of a room or a visual (e.g., virtual reality) environment, the position of the user when playback of a file or streaming of content began, etc. Additionally, the orientation data 122 may include angles of roll, pitch, and yaw, which indicate orientation of the user (or the system 400) with respect to the coordinate planes. In some examples, the orientation angles may be relative to a fixed origin, such as the origin of a gyro sensor. Thus, in at least some implementations, the position data 110 includes six measurements (e.g., an x coordinate value, a y coordinate value, a z coordinate value, a roll angle, a pitch angle, and a yaw angle). In other implementations, one or more of the six measurements are not included in the position data 110, or the position data 110 includes additional measurements, such as movement, velocity, acceleration, or others.

In some implementations, in addition to (or instead of) including the sensor device 102, the system 400 includes the input device 402. The input device 402 may include one or more sensors configured to generate the position data 410. The input device 402 may be a user input device that is configured to generate the position data 410 based on a user input. For example, the input device 402 may include a joystick, a touchpad, a game controller, a remote controller, a gesture control device, a mouse, a keyboard, or another type of user input device. The position data 410 may be generated by one or more sensors in the input device 402, such as sensors that track an orientation of a joystick, or touch sensors configured to detect a user's touch, as two non-limiting examples. The position data 410 may include or be indicative of the orientation data 420 and the translation data 421. Additionally, or alternatively, the position data 410 may include or be indicative of rotation data. For example, the position data 410 may include data indicative of a direction that a joystick is manipulated (e.g., the orientation data 420) and an amount that the joystick is manipulated in the direction (e.g., the translation data 421).

The processor 104 may include the mixer 124 and the ambisonic adjustment circuitry 130, as described with reference to FIG. 1. To illustrate, the mixer 124 may be configured to mix two or more ambisonic inputs. For example, the mixer 124 may mix a first ambisonic input (corresponding to the first ambisonic data 135) and a second ambisonic input (corresponding to the second ambisonic data 136). The mixer 124 may output a mixed ambisonic input (e.g., the mixed ambisonic data 125) to the ambisonic adjustment circuitry 130. The ambisonic adjustment circuitry 130 may be configured to adjust the mixed ambisonic input based on the position data 110, the position data 410, or both. The ambisonic adjustment circuitry 130 may generate an output (e.g., the adjusted mixed ambisonic output 131) that is rendered to generate the output spatialized audio signal 148. The processor 104 may also include the adjustment matrix generation circuitry 128 and the renderer 126, which are not illustrated for convenience.

The memory 106 may be coupled to the processor 104 and may be configured to store data and instructions used to generate a visual display and to generate spatialized audio data (e.g., the output spatialized audio signal 148). For example, the memory 106 may store the first ambisonic data 135, the second ambisonic data 136, and the third ambisonic data 137. In other implementations, the ambisonic data 135-137 may be received via the wireless interface 470, such as by streaming content from a server, and the memory 106 may store local sound data that is converted to local ambisonic data and used to enable user control of at least some audio mixing operations, as further described with reference to FIG. 8.

The output device 140 may be coupled to the processor 104 (e.g., via the wireless interface 470) and may be configured to generate visual and audio outputs to a user. The output device 140 may include a display device 422 (e.g., the display device 142) and the transducers 424 (e.g., the transducers 144). The display device 422 may be coupled to the processor 104 and configured to display visual content associated with a multimedia program (e.g., an audio/visual program). The output device 140 may also include at least two speakers (e.g., the transducers 424) that are coupled to the processor 104 and configured to generate audio output based on an output spatialized audio signal 148 from the processor 104. The audio output generated based on the output spatialized audio signal 148 may enable user perception of changes in distance and direction of sounds based on the user's navigation through the virtual environment associated with the audio/visual program.

In a particular implementation, the system 400 includes multiple devices and is a distributed system. To illustrate, the system 400 may include a mobile device (e.g., a mobile phone or other mobile device) that includes the processor 104 and the memory 106. In this implementation, the display device 422 includes a display of the mobile device, and the mobile device is coupled to a head-mounted apparatus (e.g., the HMD). For example, the HMD may include eyepieces that are configured to be removably coupled to a display of a mobile device. Thus, the mobile device may display the virtual environment and may generate the output spatialized audio signal 148 that is provided to the transducers 424 within a headset. The position data 410 may be received from the input device 402 integrated in (or coupled to) a head-mounted apparatus (e.g., the HMD and the headset). In other implementations, the sensor device 102 may be included in the mobile device, and the mobile device may generate the position data 110, the position data 410, or both.

In another particular implementation, the processor 104 and the memory 106 may be included in a mobile device, however a display of the mobile device does not serve as the display device 422. Instead, the HMD includes the display device 422. The mobile device may process the spatialized audio signals and visual data to provide output data (e.g., the output spatialized audio signal 148 and output visual data) to the output device 140. For example, the processor 104 of the mobile device may be configured to generate visual data based on the virtual environment and to provide the visual data to the display device 422 for display to the user. Additionally, the processor 104 of the mobile device may be configured to process the output spatialized audio signal 148 (e.g., based on the position data 110 or the position data 410) to generate the output spatialized audio signal 148 and the processor 104 may provide the output spatialized audio signal 148 to the transducers 424 (e.g., the speakers of the headset) for output to the user. In other implementations, each of the components of the system 400 may be integrated in a single device, such as a single wearable virtual reality device.

During operation, the system 400 may execute the audio/visual program. The processor 104 may initiate display of the virtual environment at the display device 422, and the transducers 424 may output audio content associated with the audio/visual program. The user may navigate in the virtual environment. For example, the user may move (e.g., translate) or rotate her head, or the user may provide an input to the input device 402. The sensor device 102 may generate the position data 110 and may be provided to the processor 104. The position data 110 (or the position data 410) may indicate that the user has navigated from a first position to a second position. The processor 104 may generate modified visual data based on a difference between the first position and the second position, and the processor 104 may initiate display of the modified visual data at the display device 422. The processor 104 may process the ambisonic data 135-137 based on the position data 410 to generate the output spatialized audio signal 148, and the output spatialized audio signal 148 may be rendered and output via the transducers 424. The system 400 of FIG. 4 may thus enable generation of spatialized audio output using fewer processing resources than other systems.

Figure 5:
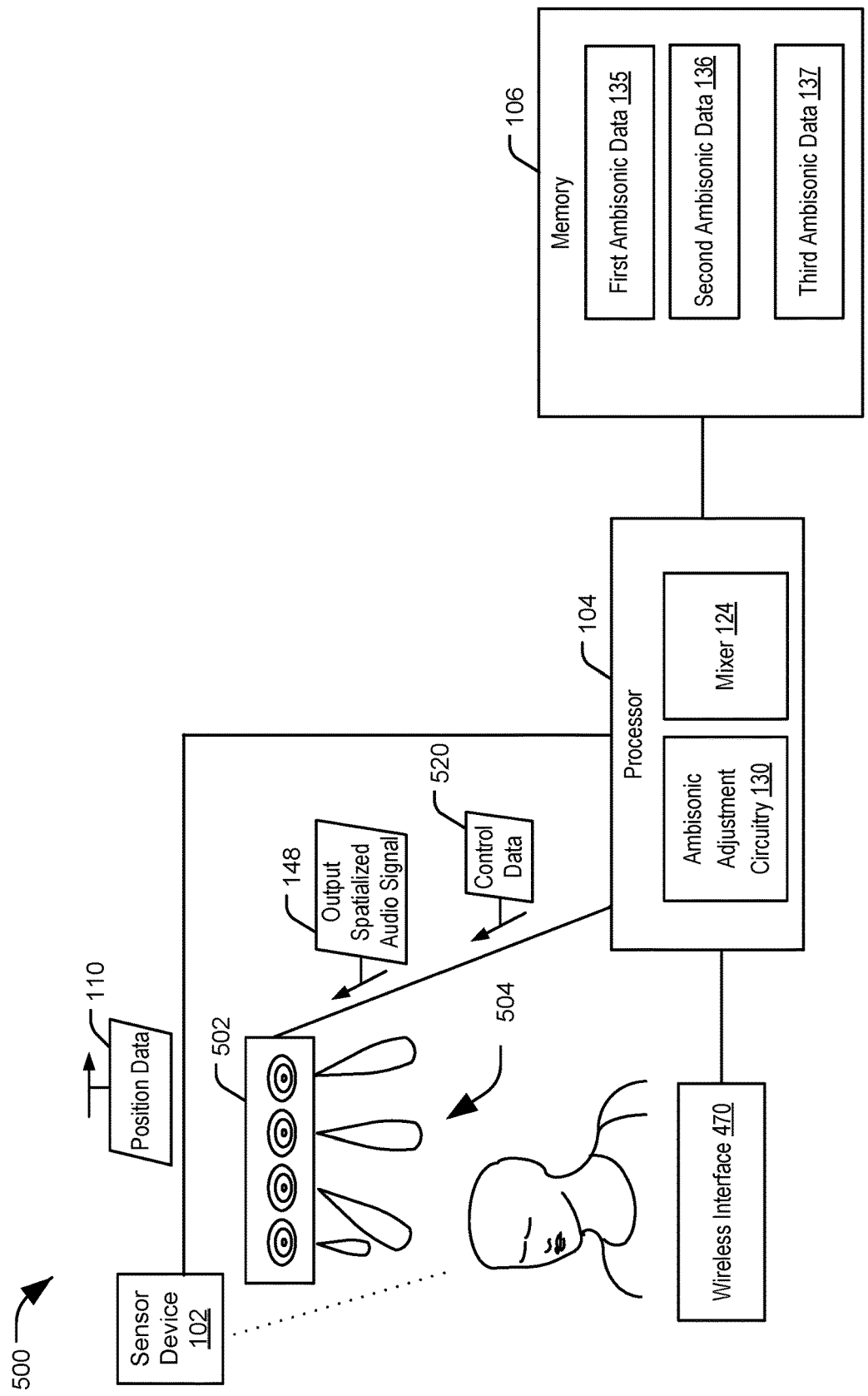
FIG. 5 illustrates a block diagram of a block diagram of an aspect of a system that generates spatialized audio signals based on multi-input ambisonic mixing and adjustment.

Referring to FIG. 5, an illustrative implementation of an aspect of a system that generates spatialized audio signals based on based on multi-input ambisonic mixing and adjustment is shown and generally designated 500. The system 500 includes an audio device 502 (e.g., a speaker array), the sensor device 102, the processor 104, the memory 106, and the wireless interface 470. The processor 104 includes the ambisonic adjustment circuitry 130 and the mixer 124. The processor 104 may also include the adjustment matrix generation circuitry 128 and the renderer 126, which are not illustrated for convenience. In a particular implementation, the memory 106 includes the ambisonic data 135-137. Alternatively, the ambisonic data 135-137 may be received (e.g., via the wireless interface 470), and the memory 106 may store local ambisonic data.

In the implementation illustrated in FIG. 5, the audio device 502 includes a speaker array, and the sensor device 102 is separate from the audio device 502 and configured to determine the position data 110. For example, the sensor device 102 may include a camera or other optical device configured to determine the position data 110 associated with the user. In another particular implementation, the sensor device 102 may be a movement sensor, such as a position sensor, an accelerometer, an orientation sensor, etc., that is worn by (e.g., coupled to) the user. In another particular implementation, the sensor device 102 may be integrated within a user interface device, and the position data 110 may indicate movement of the user in a virtual or AR environment.

The system 500 may be configured to operate similarly to the system 100 of FIG. 1, the system 400 of FIG. 4, or a combination thereof. The audio device 502 may be configured to perform beamforming (e.g., to generate audio outputs 504, such as audio waves, that are directed in particular directions) based on the output spatialized audio signal 148. For example, the audio device 502 may include one or more audio amplifiers and one or more audio filters configured to implement beamforming to direct audio waves (e.g., audio outputs) in particular directions. In this implementation, the audio device 502 (e.g., the audio filters) may be configured to direct the audio output (e.g., the audio waves) in particular directions based on spatialized audio signals (e.g., the output spatialized audio signal 148). In some implementations, the processor 104 may be further configured to generate control data 520 (e.g., a control signal) to enable the audio device 502 (e.g., the speaker array) to perform the beamforming. For example, the control data 520 may include one or more filter coefficients used by the audio filters of the audio device 502 to perform the beamforming.

The system 500 of FIG. 5 may enable a speaker array (e.g., the audio device 502) to perform beamforming to output the output spatialized audio signal 148. Thus, the techniques of the present disclosure may improve a spatialized audio listening experience associated with binaural headphone output as well as multi-channel speaker output.

In the above description, various functions performed by the system 500 of FIG. 5 are described as being performed by certain components. However, this division of components is for illustration only. In an alternate implementation, a function performed by a particular component may instead be divided amongst multiple components. Moreover, in an alternate implementation, two or more components of FIG. 5 may be integrated into a single component. For example, the processor 104 and the memory 106 may be integrated in a single component. Each component illustrated in FIG. 5 may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 6:
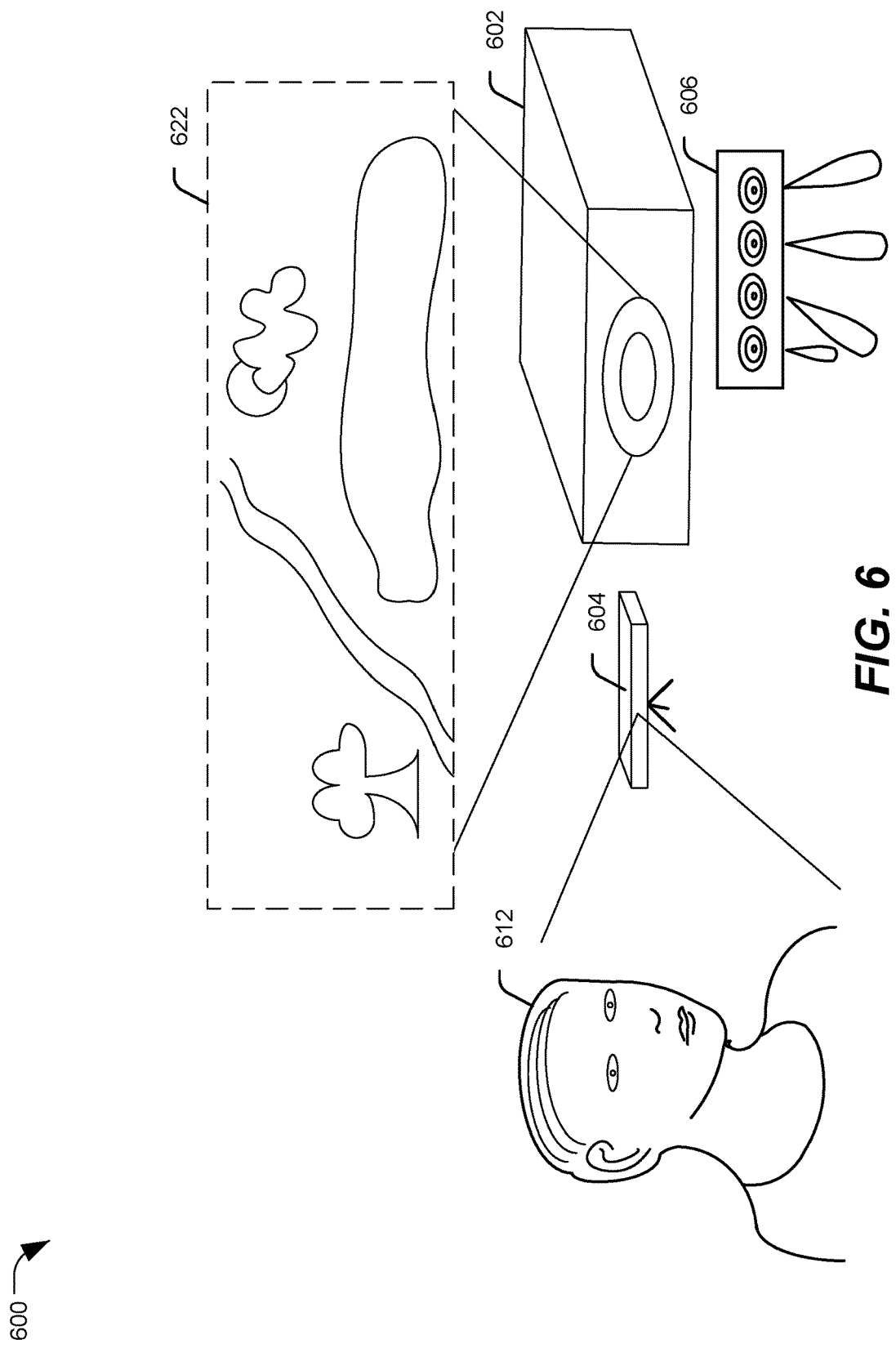
FIG. 6 illustrates a block diagram of a block diagram of an aspect of a system that generates spatialized audio signals based on multi-input ambisonic mixing and adjustment.

Referring to FIG. 6, a diagram of an aspect of a system that generates spatialized audio signals based on based on multi-input ambisonic mixing and adjustment is shown and generally designated 600. The system 600 includes a projection device 602, a sensor device 604, and a speaker array 606. The system 600 may also include the processor 104 and the memory 106 of FIG. 1, which are not illustrated for convenience. For example, the processor 104 and the memory 106 may be included in the sensor device 604, the projection device 602, or the speaker array 606. In some implementations, the projection device 602, the sensor device 604, the speaker array 606, and the processor 104 may be distinct components and may be wirelessly coupled together.

The projection device 602 may be configured to project one or more visual projections 622 associated with an audio/visual program, such as an audio/visual program stored in the memory 106. For example, the projection device 602 may be configured to project one or more visual projections 622 of the virtual environment. To illustrate, the projection device 602 may project light-based images onto one or more projection screens, one or more walls, or one or more other surfaces. The one or more visual projections may display the virtual environment to a user 612. As a particular example, the projection device 602 may include four projectors, and each projector may project an image onto one of four walls of a room. The one or more visual projections 622 may enable the user 612 to perceive the virtual environment as though the user was located in the virtual environment. The one or more visual projections 622 may be modified based on user movement (e.g., the position data 110, the position data 410, or both), or based on user input received via an input device.

The sensor device 604 may include one or more sensors configured to determine a position and an orientation of the user 612. For example, the sensor device 604 may include a camera or another optical device configured to determine the position and the orientation of the user 612. In another particular implementation, the sensor device 604 includes other movement sensors, such as position sensors, accelerometers, orientation sensors, etc., that are worn by (e.g., coupled to) the user 612. The sensor device 604 may be configured to generate sensor data, such as the position data 110 or the position data 410, that is indicative of a translation, a rotation, or both of the user 612. The sensor data may be provided to the processor 104 for use in generating output spatialized audio signals, such as the output spatialized audio signal 148.

The speaker array 606 may be configured to generate audio output based on spatialized audio signals. To illustrate, the speaker array 606 may include one or more transducers (e.g., loud speakers) that are configured to generate audio outputs using beamforming (e.g., generating audio outputs, such as audio waves, that are directed in particular directions). For example, the speaker array 606 may include one or more audio amplifiers and one or more audio filters configured to implement beamforming to direct audio waves (e.g., audio outputs) in particular directions. In this implementation, the speaker array 606 (e.g., the audio filters) is configured to direct the audio output (e.g., the audio waves) in particular directions based on spatialized audio signals. The audio outputs may be directed using beamforming to simulate an audio environment associated with audio/visual program. For example, the speaker array 606 may generate an output that enables user perception of a distance and a direction of a sound. As an illustration, a bird may chirp to the right of the user in the virtual environment, and the speaker array 606 may be configured to generate an output of a bird chirp that, due to the beamforming, is perceived by the user 612 as being to the right of the user 612. The beamforming may include filtering one or more audio signals based on one or more filter coefficients that are determined by the processor 104. The speaker array 606 may include or correspond to the input/output device 114, the transducers 144, the output device 140, the transducers 424, the audio device 502, or a combination thereof.

During operation, the system 600 device operates similarly to the system 400 of FIG. 4 or to the system 500 of FIG. 5. For example, the processor 104 may generate an output spatialized audio signal (e.g., the output spatialized audio signal 148) and may initiate one or more audio outputs at the speaker array 606 based on the output spatialized audio signal. For example, the processor 104 may generate one or more control signals or one or more filter coefficients for use by the audio filters of the speaker array 606 to perform the beamforming when generating the audio outputs. The output spatialized audio signal may enable user perception of a change in a direction or a distance of a sound that corresponds to a change in the visual representation of the virtual environment.

The system 600 of FIG. 6 may thus enable generation of spatialized audio output using fewer processing resources than other systems. The system 600 may provide 3D audio to a user using beamforming.

Figure 7:
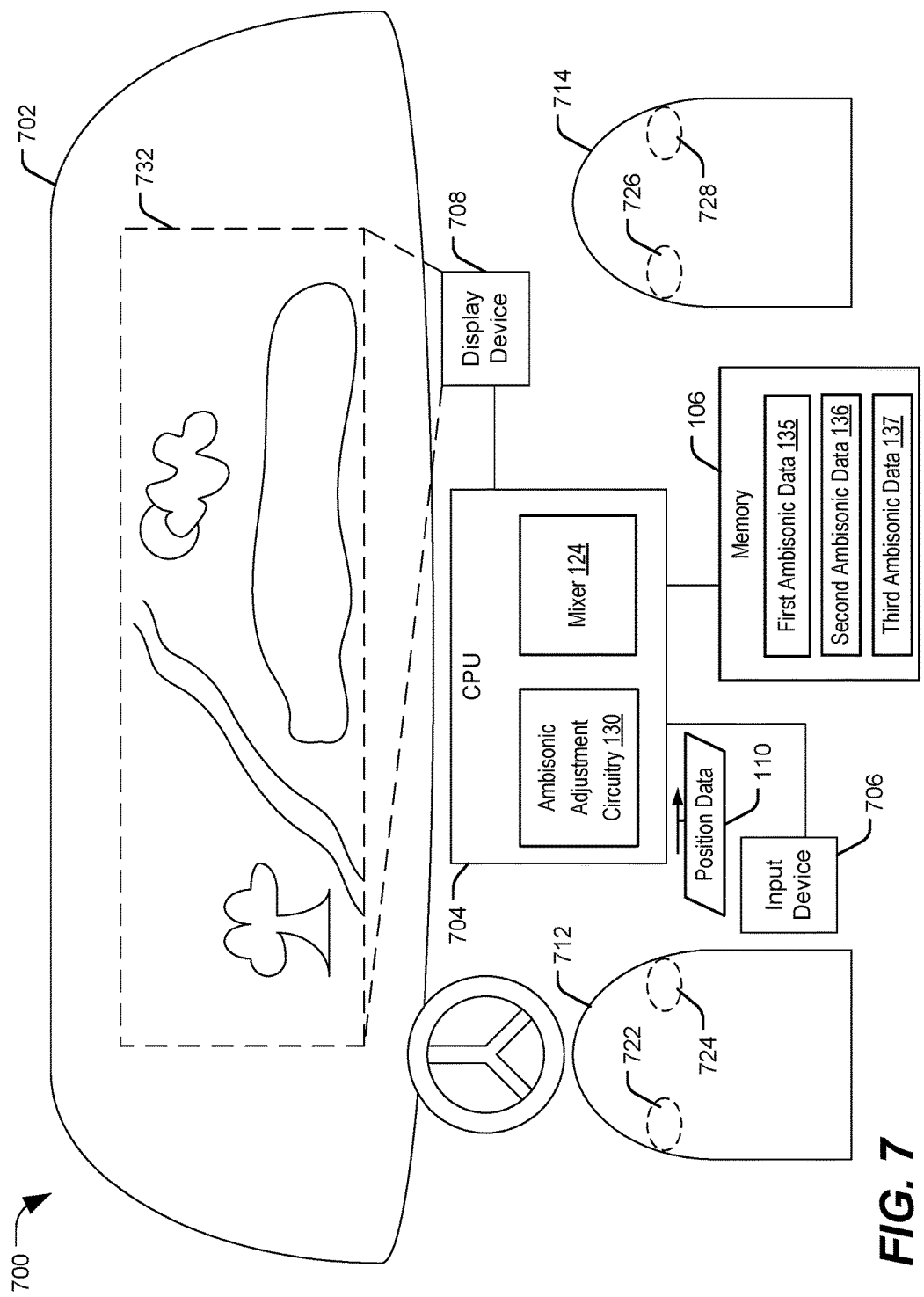
FIG. 7 illustrates a block diagram of a block diagram of an aspect of a system that generates spatialized audio signals based on multi-input ambisonic mixing and adjustment.

Referring to FIG. 7, a diagram of an aspect of a system that generates spatialized audio signals based on based on multi-input ambisonic mixing and adjustment is shown and generally designated 700. The system 700 may be included in a vehicle, such as a car, a truck, a boat, an airplane, a helicopter, or another type of vehicle. In some implementations, the vehicle is an autonomous vehicle.

The system 700 includes a central processing unit (CPU) 704, an input device 706, a display device 708, the memory 106, and a plurality of speakers 722, 724, 726, and 728. The CPU 704, the input device 706, the display device 708, the memory 106, and the plurality of speakers 722, 724, 726, and 728 may be distinct components and may be wirelessly coupled together. Additionally, or alternatively, the CPU 704, the input device 706, the display device 708, the memory 106, and the plurality of speakers 722, 724, 726, 728 may be coupled by wires or may be integrated together in a single component or device.

The CPU 704 includes the ambisonic adjustment circuitry 130 and the mixer 124. The CPU 704 may also include the adjustment matrix generation circuitry 128 and the renderer 126, which are not illustrated for convenience. The CPU 704 may include or correspond to the processor 104, the sensor device 604, or a combination thereof. The input device 706 may include or correspond to the sensor device 102, the input/output device 114 (e.g., the display device 142), the input device 402, or a combination thereof. The display device 708 may include or correspond to the input/output device 114 (e.g., the display device 142), the output device 140, the display device 422, the audio device 502, the projection device 602, the speaker array 606, or a combination thereof. The plurality of speakers 722-728 may include or correspond to the input/output device 114 (e.g., the transducers 144), the output device 140, the transducers 424, the audio device 502 the speaker array 606, or a combination thereof.

The display device 708 may be configured to project one or more visual projections associated with an audio/visual program, such as the audio/visual program (not shown) stored in the memory 106. For example, the display device 708 may be configured to project one or more visual projections 732 of a virtual environment. To illustrate, the display device 708 may project images onto a windshield 702 of the vehicle. The one or more visual projections 732 may display the virtual environment to a user. The one or more visual projections 732 may enable the user to perceive the virtual environment as though the user was located in the virtual environment. The one or more visual projections 732 may be modified based on user input received via the input device 706. In a particular implementation, the audio/visual program may be associated with a navigation program for the vehicle. For example, the vehicle may be an autonomous or semi-autonomous vehicle, and the audio/visual program may enable a user to operate or issue commands to the vehicle. In other implementations, the audio/visual program includes a different program, such as a video game, a movie, an interactive program, a video-conferencing application, or other programs.

The input device 706 may include one or more sensors configured to generate the position data 110. The position data 110 may further include or correspond to the position data 410. The input device 706 may be configured to generate the position data 110 based on a user input. For example, the input device 706 may include a joystick, a touchpad, a game controller, a remote controller, a gesture control device, a mouse, a keyboard, a headset, or another type of user input device. The position data 110 may be indicative of a rotation, a translation, and an orientation of the user in the virtual environment. The position data 110 may be provided to the CPU 704 for use in generating output spatialized audio signals, such as the output spatialized audio signal 148, as described with reference to FIGS. 1-6.

The system 700 also includes a first speaker 722, a second speaker 724, a third speaker 726, and a fourth speaker 728. A pair of speakers may be integrated into a seat within the vehicle. For example, the first speaker 722 and the second speaker 724 may be integrated within a driver's seat 712 of the vehicle, and the third speaker 726 and the fourth speaker 728 may be integrated within a passenger's seat 714 of the vehicle. The speakers 722-728 may be configured to generate audio output based on spatialized audio signals from the CPU 704. The audio outputs may enable user perception of a direction or a distance of a sound corresponding to the virtual environment. For example, a bird may chirp to the right of the user in the virtual environment, and the speakers 722-728 may be configured to generate an audio output of a bird chirp that is perceived by the user as being to the right of the user. Speakers integrated in each seat may provide the audio outputs to a corresponding user. For example, speakers integrated in the driver's seat 712 may provide audio outputs to a driver of the vehicle, and speakers integrated in the passenger's seat 714 may provide audio outputs to a passenger.

During operation, the system 700 device operates similarly to the system 100 of FIG. 1, the system 400 of FIG. 4, the system 500 of FIG. 5, and the system 600 of FIG. 6. For example, the CPU 704 may generate visual data of the virtual environment for display to the user. The visual data may be used to generate the one or more visual projections 732 by the display device 708. The user may navigate the virtual environment by using the input device 706. The input device 706 may transmit sensor data (or other data) to the CPU 704 that indicates a position, an orientation, etc., associated with the user in the virtual environment. The CPU 704 may generate modified visual data based on the sensor data, and the modified visual data may be used to modify the one or more visual projections 732.

Additionally, the CPU 704 may generate an output spatialized audio signal and may initiate one or more audio outputs at the speakers 722-728 based on the output spatialized audio signal. The audio outputs may enable user perception of a change in a direction or a distance of a sound that corresponds to a change in the visual representation of the virtual environment. For example, the display device 708 may project a display of the virtual environment on the windshield 702, and the speakers 722-728 (e.g., two or more speakers) may generate an audio output based on a first version (e.g., an output version) of a spatialized audio signal. The movement indicated by the sensor data may be quantized, and modifications to a mixed ambisonic signal (e.g., the mixed ambisonic data 125 of FIG. 1) may be performed, as described with reference to FIG. 1.

The system 700 of FIG. 7 may thus enable generation of spatialized audio output using fewer processing resources than other systems. Additionally, the system 700 may provide 3D audio to a user of a vehicle. The combination of 3D audio and the visual projections of the virtual environment may provide an immersive audio/visual experience to a user.

Figure 8:
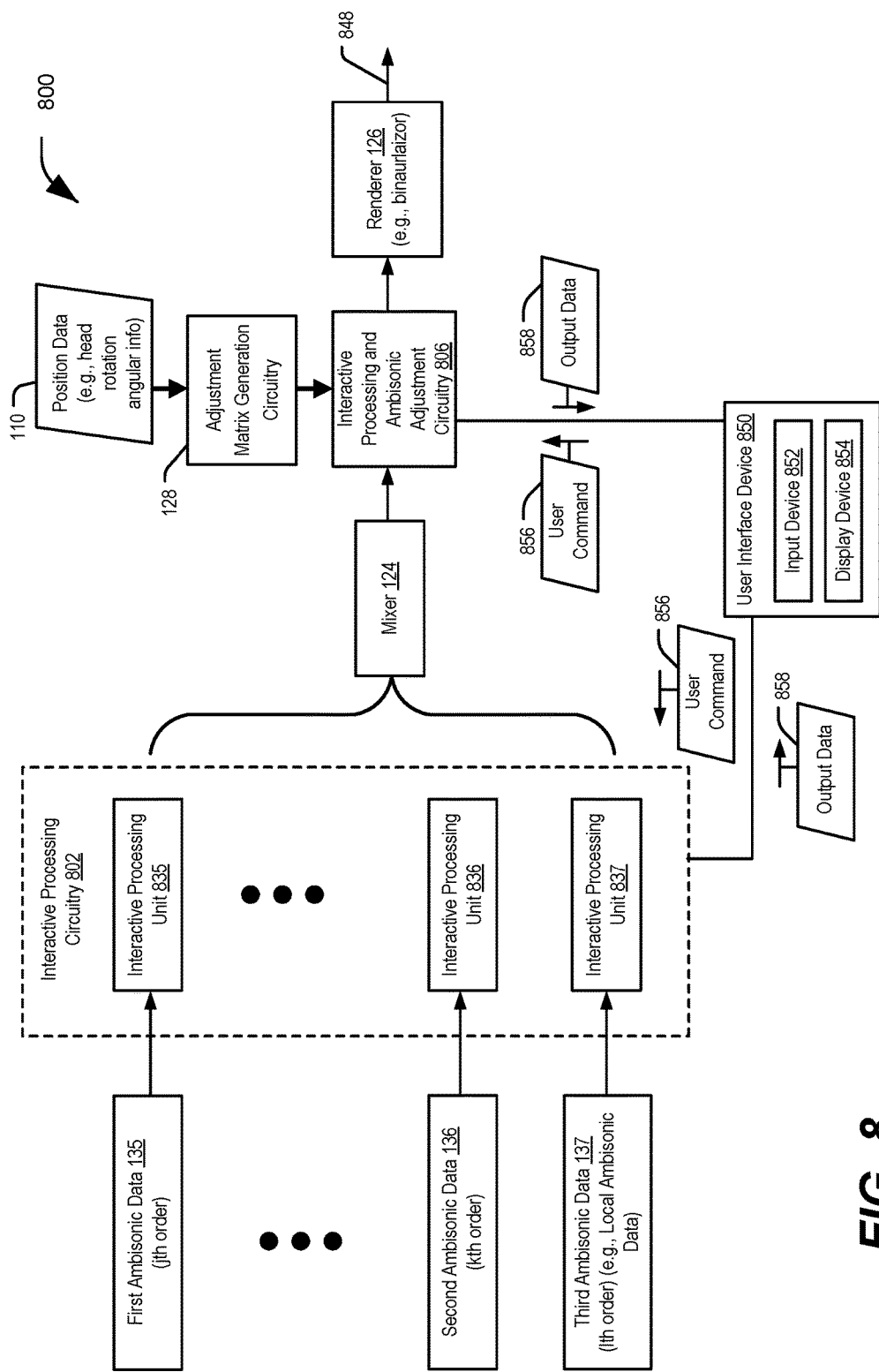
FIG. 8 is a block diagram illustrating an example of a system that generates or modifies ambisonic data based on user input.

Referring to FIG. 8, a block diagram to illustrate an aspect of a system 800 that generates or modifies ambisonic data based on user input is shown. The ambisonic data may be adjusted prior to or subsequent to mixing, as further described herein. In a particular implementation, the system 800 may be included in or integrated in the processor 104 of FIG. 1.

The system 800 includes interactive processing circuitry 802, the mixer 124, interactive processing and ambisonic adjustment circuitry 806 (e.g., rotators, translators, etc.), the adjustment matrix generation circuitry 128, the renderer 126, and a user interface device 850. The interactive processing circuitry 802 is configured to receive ambisonic data and to process the ambisonic data based on user input prior to providing the ambisonic data to the mixer 124 for mixing. For example, the interactive processing circuitry 802 includes an interactive processing unit 835 that is configured to process the first ambisonic data 135, an interactive processing unit 836 configured to process the second ambisonic data 136, and an interactive processing unit 837 configured to process the third ambisonic data 137. Although FIG. 8 illustrates three ambisonic data sets 135-137 and three corresponding interactive processing units 835-837, in other implementations, additional (or fewer) ambisonic data sets and interactive processing units may be implemented.

A user may adjust the ambisonic data 135-137 prior to performance of mixing operations at the mixer 124. To illustrate, the user interface device 850 includes an input device 852 configured to receive a user input and to generate a user command 856. The user input may include a gesture from hand tracking, a gesture from multi-touch actions, a voice command, etc. Non-limiting examples of voice commands as the user input include a voice command to rotate a sound field by a particular degree amount, a voice command to adjust the volume, etc. Non-limiting examples of gestures as the user input include a two-finger pinch to zoom into a particular direction of the sound field, a swiping gesture to control (e.g., add to, remove from, pause, resume) the sound field, a multi-touch swirl to rotate the sound field, etc. The user interface device 850 may be configured to generate (or extract) user interaction information from the user input and to determine the user command 856 (e.g., one or more commands indicated by the information) based on the user input. In certain implementations, the input device 852 may include a motion sensor to detect the gestures, a speech recognition engine (e.g., a speech recognition processor) to detect the voice commands, a keypad, a touchpad, or some other form of input device. The user command 856 may be provided to the interactive processing circuitry 802 (and to the interactive processing and ambisonic adjustment circuitry 806) to cause adjustment to the ambisonic data based on user inputs.

As a non-limiting example, if the user input is a voice command, the input device 852 may include a speech recognition engine that extracts the voice command from an input audio signal. To illustrate, the user input may include a voice command that states "rotate left by 90 degrees." The user interface device 850 may generate the user command 856 to cause one or more of the ambisonic inputs indicated by the ambisonic data 135-137 to be rotated to the left by 90 degrees. For example, rotation data (e.g., indicative of a rotation matrix) may be generated and multiplied by one or more of the ambisonic data 135-137.

The user interface device 850 may also include a display device 854. The display device 854 may include a screen, a touchscreen, or other type of display device. The display device 854 may be configured to display a visualization of the audio scene corresponding to the ambisonic data 135-137, a visualization of the user interaction, other information, or a combination thereof, based on output data 858 (e.g., visualization data). For example, visualization feedback may be sent back to the user in terms of animation to indicate the sound field has been adjusted (e.g., rotated, paused, etc.). In a particular implementation, the display device 854 displays a graphical user interface (GUI) to enable user control of at least some mixing operations, as further described with reference to FIG. 9.

Each interactive processing unit of the interactive processing circuitry 802 may be configured to adjust corresponding ambisonic data based on the user command 856. To illustrate, the interactive processing unit 835 may be configured to adjust the first ambisonic data 135 based on the user command 856. Using the above example, the interactive processing unit 835 may include a plurality of ambisonic adjusters that are each configured to apply a corresponding adjustment matrix (e.g., a rotation matrix, a translation matrix, or a combination thereof) to the first ambisonic data 135. For example, the interactive processing unit 835 may rotate components of the first ambisonic data 135 to the left by 90 degrees. In a similar manner, the interactive processing units 836, 837 may adjust the ambisonic data 136, 137, respectively, based on the user command 856. Additionally, or alternatively, other modifications may be implemented by the interactive processing circuitry 802. To illustrate, a volume, an echo, a sound effect, another parameter, or a combination thereof, may be modified based on the user command 856. Although illustrated as a single command, the user command 856 may include multiple commands, and different ambisonic data may be modified based on different commands. For example, the user command 856 may include a first command to rotate a sound field to the left by 90 degrees and a second command to increase a volume. The interactive processing unit 835 may adjust the first ambisonic data 135 to perform a rotation, and the interactive processing unit 836 may adjust the second ambisonic data 136 to increase the volume. Thus, the user command 856 can include multiple commands associated with the same data or with different ambisonic data.

In a particular implementation, local ambisonic data may be mixed with other ambisonic inputs (e.g., ambisonic input data from a VR program, streaming ambisonic audio, etc.). For example, the third ambisonic data 137 (or other ambisonic data) may include related or unrelated ambisonic data that is stored locally, such as at a memory (e.g., the memory 106). The local ambisonic data is different than other ambisonic data that corresponds to a particular audio/visual or multimedia program and that may be received via a network (e.g., via streaming). In some implementations, the local ambisonic data (e.g., the third ambisonic data 137) is stored in a particular format, such as a HOA format, at the memory. Alternatively, the local ambisonic data (e.g., the third ambisonic data 137) may be stored in other audio formats (e.g., a .wav file, a .mp3 file, etc.) and converted to ambisonic data prior to mixing. Additionally, audio content can be recorded, for example at a mobile device that performs the ambisonic processing, and the recorded audio content can be converted to ambisonic format and stored as the local ambisonic data (or stored in a different format and converted to ambisonic data prior to mixing). The local ambisonic data may also be modified based on the user command 856 prior to mixing.

The mixer 124 is configured to mix the adjusted ambisonic input signals in a similar manner as described with respect to FIG. 2. According to some implementations, the interactive processing and ambisonic adjustment circuitry 806 may adjust the output of the mixer 124 based on the user command 856 (e.g., post-mixing adjustment), based on an adjustment matrix generated by the adjustment matrix generation circuitry 128, or both. The post-mixing adjustment may be performed in a substantially similar manner as the pre-mixing adjustment. For example, the interactive processing and ambisonic adjustment circuitry 806 may include a plurality of ambisonic adjusters that are each configured to apply a corresponding adjustment matrix (e.g., a rotation matrix, a translation matrix, or a combination thereof) to the output of the mixer 124. Additionally, the interactively processing and ambisonic adjustment circuitry 806 may be configured to perform the operations The renderer 126 is configured to receive the output of the interactive processing and ambisonic adjustment circuitry 806 and to generate a spatialized audio signal 848. According to some implementations, the spatialized audio signal 848 corresponds to the output spatialized audio signal 148 of FIG. 1. In some implementations, the spatialized audio signal 848 represents audio content associated with the audio/visual program. The renderer 126 may provide the spatialized audio signal 848 to the output device 140 of FIG. 1.

Thus, the system 800 enables adjustment of any ambisonic input (e.g., the first ambisonic data 135, the second ambisonic data 136, the third ambisonic data 137, or a combination thereof) based on user input. For example, the ambisonic data 135-137 may be adjusted in an interactive manner based on user input (corresponding to the user command 856). To illustrate, the user may rotate a sound field using a two-finger rotation or hand drag on a touch screen displaying an icon associated with the sound field or the user may adjust the volume of a particular ambisonic input by scrolling or swiping with a finger near the icon. As another example, a counter-clockwise finger swirl gesture on the touchscreen near the icon may cause a leftward rotation operation to be performed on one or more of the ambisonic data 135-137. Additionally, or alternatively, the user may use a voice command to modify the ambisonic data 135-137.

Additionally, the system 800 enables the user to create ambisonic data using local audio data. For example, if the user is attending a concert, the user can record a local sound field of the concert. The recorded sound field may be further modified using the interactive modification described with respect to FIG. 8. For example, the user may reduce the volume coming from the back (e.g., to reduce noise from the crowd), increase the volume coming from the stage, or perform other modifications. As another example, a user may record a sound source to add to ambisonic inputs of a VR or AR program, thereby improving the user experience.

Figure 9:
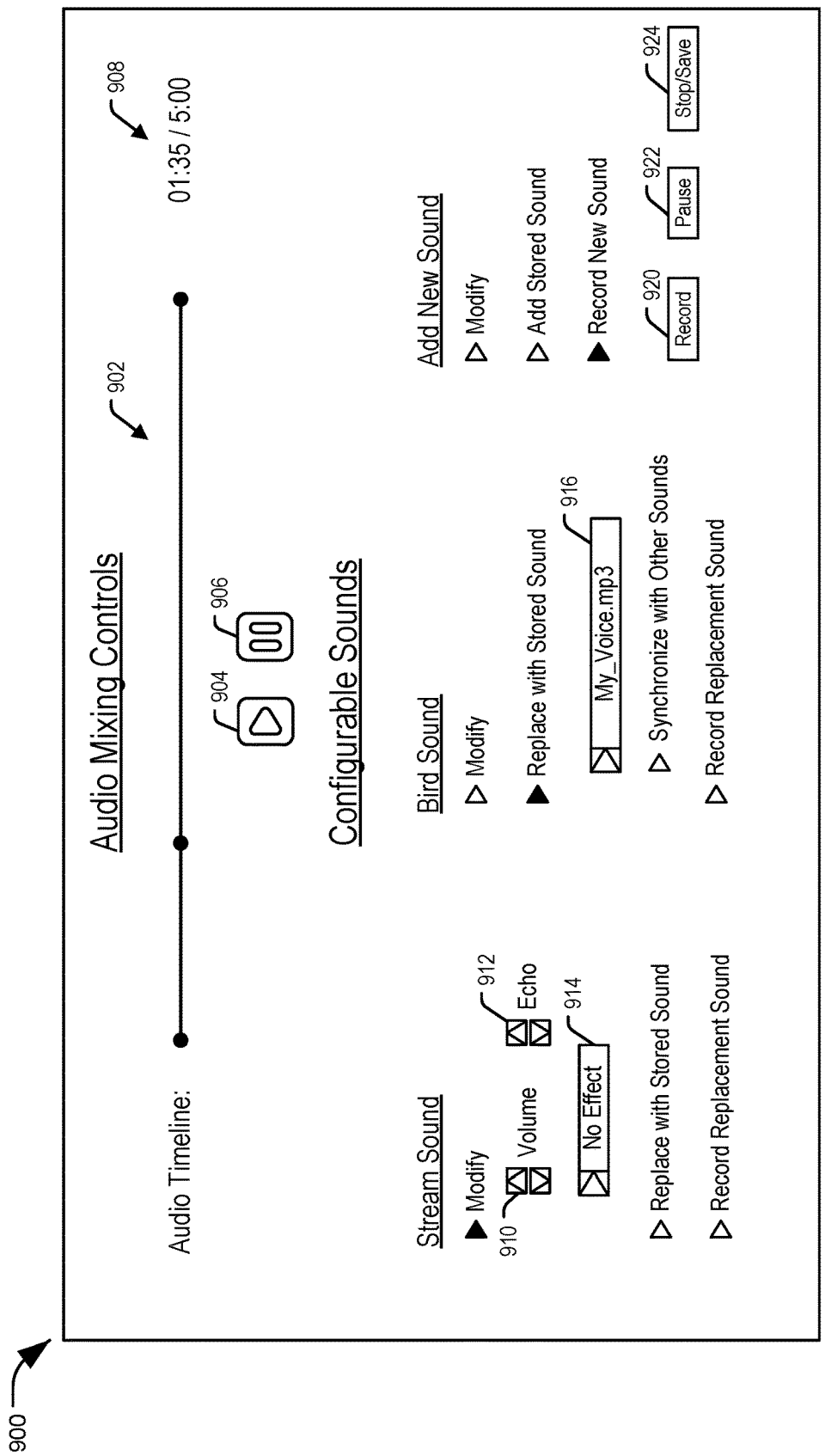
FIG. 9 is a diagram illustrating an example of an aspect of a graphical user interface (GUI) that enables user control of aspects of ambisonic processing.

Referring to FIG. 9, an example of a GUI that enables user control of aspects of ambisonic processing is depicted and generally designated 900. In some implementations, the GUI 900 may be generated and displayed by the processor 104 of FIGS. 1, 4, 5, and 6 or the CPU 704 of FIG. 7.

The GUI 900 includes information associated with playback of audio content, local ambisonic data (or other audio data that can be converted to ambisonic data) stored at a memory (e.g., the memory 106), one or more modification operations associated with the local ambisonic data, one or more mixing operations, or a combination thereof.

In a particular implementation, the GUI 900 includes an audio timeline 902, a duration indicator 908, a play button 904, and a pause button 906. The audio timeline 902 includes a visual indication of a timeline associated with playback of audio content, such as audio content corresponding to an audio/visual program or a multimedia program. In some implementations, the audio content is associated with a VR application or an AR application, as described with reference to FIG. 1. The audio timeline 902 may be selectable to advance to (or return to) a particular point in the playback of the audio content. The duration indicator 908 may indicate the particular point in time with respect to a total duration of the audio playback. The play button 904 may be selectable to cause playback of the audio content, and the pause button 906 may be selectable to pause the playback of the audio content.

The GUI 900 may also include information and controls associated with one or more sound sources included in the audio content. In the particular implementation illustrated in FIG. 9, the GUI 900 indicates two sounds sources (e.g., a stream sound and a bird sound) that are included in the audio content. In other implementations, more than two sound sources may be included in the audio content. The number of sound sources in the audio content may be different at different times (e.g., a sound source may appear three minutes into the audio playback), and thus the sound sources that are included in the GUI 900 may be different at different points during the playback of the audio content.

The GUI 900 may include one or more selectable indicators that enable user control of aspects of the audio mixing and processing. For example, the GUI 900 may include, for each sound source, a selectable indicator that enables modification of the sound source, a selectable indicator that enables the sound source to be replaced with stored audio content, and a selectable indicator that enables the recording of new audio content to be used to replace the sound source. In other implementations, other selectable indicators may be included in the GUI 900.

Selection of a particular selectable indicator may cause additional options corresponding to additional selectable indicators to appear in the GUI 900. For example, selection of a "modify" indicator of the stream sound may cause the GUI 900 to display a volume control 910, an echo control 912, and a sound effect control 914. In a particular implementation, the volume control 910 includes an increase button and a decrease button, the echo control 912 includes an increase button and a decrease button, and selection of the sound effect control 914 displays a drop-down menu of sound effects that may be applied to the stream sound. In other implementations, other types of selectable indicators may be used. Thus, selection of a particular selectable indicator (e.g., the modify indicator) enables user control and modification of aspects of a corresponding ambisonic input (e.g., the stream sound).

As another example, selection of a "replace with stored sound" indicator of the bird sound may cause the GUI 900 to display a sound selection control 916 and a synchronization indicator. The sound selection control 916 may enable a user to select a sound file stored locally (e.g., at the memory 106) to replace the corresponding sound source. For example, the user may select to replace the bird sound with the sound file "My_Voice.mp3". In some implementations, the sound files are stored in an ambisonic format. In other implementations, the sound files are stored in other formats and are converted into ambisonic format prior to mixing with the other existing ambisonic inputs. Selection of the synchronization indicator may cause a replacement ambisonic input to be synchronized with the other existing ambisonic inputs (e.g., to be synchronized with the replaced ambisonic input). Alternatively, if the synchronization indicator is not selected, the replacement ambisonic input is mixed at the particular time indicated by the audio timeline 902 (e.g., without being synchronized).

Additionally, the GUI 900 may enable a user to add a new sound as a new sound source to be included in the mix. For example, the GUI 900 may include selectable indicators that enable the addition of a stored sound or addition of a newly recorded sound. For example, selection of the "record new sound" indicator may cause a record button 920, a pause button 922, and a stop/save button 924 to be displayed. Selection of the record button 920 may cause a microphone of a device that is displaying the GUI 900 (or that is coupled to the device) to record audio. Selection of the pause button 922 may pause the recording of the audio. Selection of the stop/save button 924 may cause the recorded audio to be converted to an ambisonic input that is added to the mix. The new sound may also be modified by selection of a "modify" indicator.

The GUI 900 may thus enable user control of audio mixing and spatialized audio output generation. For example, the GUI 900 may enable a user to modify (or replace) existing ambisonic inputs, to add additional ambisonic inputs, to modify properties of the additional ambisonic inputs, or to modify properties of the mixed ambisonic properties, thereby improving a user experience of a device, such as a mobile device, that performs ambisonic processing.

Figure 10:
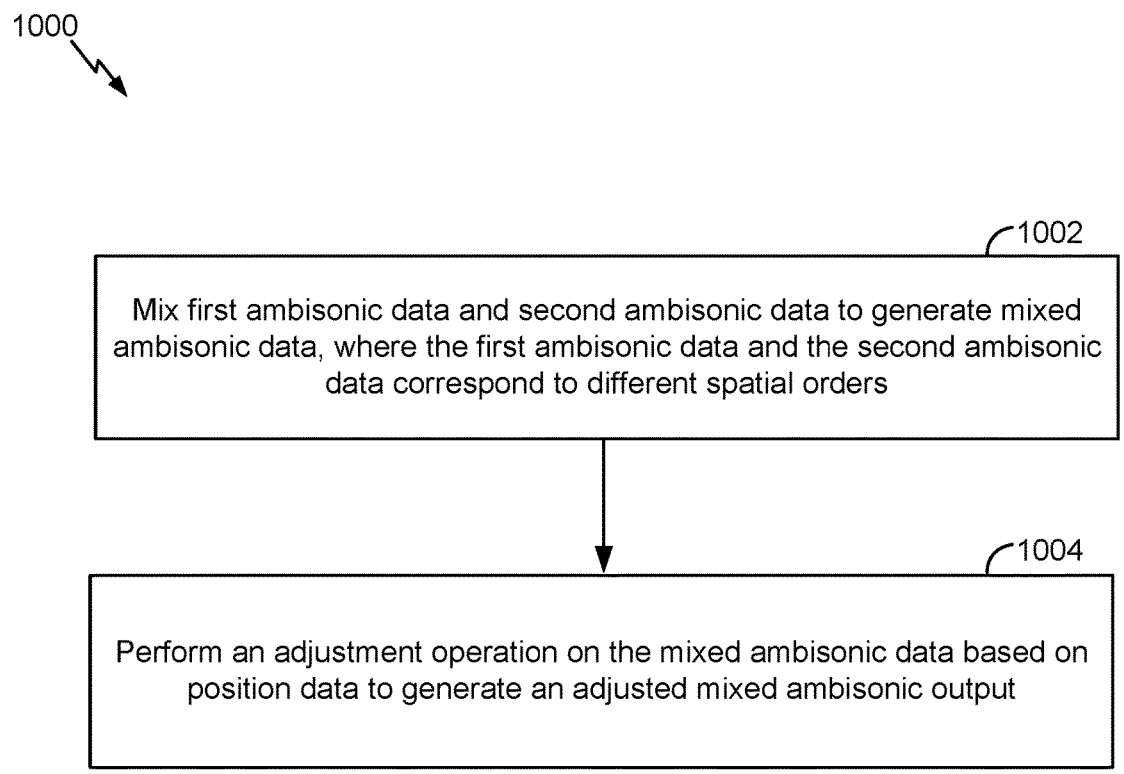
FIG. 10 is a flow chart of a method of multi-input ambisonic processing.

Referring to FIG. 10, a method 1000 of multi-input ambisonic processing (e.g., a method of audio processing) is shown. The method 1000 may be performed by the processor 104, the adjustment matrix generation circuitry 128, the ambisonic adjustment circuitry 130, the mixer 124, the renderer 126, the input/output device 114, the output device 140 of FIG. 1, the input device 402 of FIG. 4, the sensor device 604 of FIG. 6, the CPU 704 of FIG. 7, the interactive processing circuitry 802, the interactive processing and ambisonic adjustment circuitry 806 of FIG. 8, or a combination thereof.

The method 1000 includes mixing first ambisonic data and second ambisonic data to generate a mixed ambisonic input, at 1002. The first ambisonic data and the second ambisonic data correspond to different spatial orders. For example, the first ambisonic data and the second ambisonic data may include or correspond to the first ambisonic data 135, the second ambisonic data 136, or the third ambisonic data 137. The first ambisonic data 135 and the second ambisonic data 136 (and the third ambisonic data 137) may correspond to different spatial orders, such as a first spatial order, a second spatial order, and a fourth spatial order, as a non-limiting example. The mixing may be performed by the processor 104, the mixer 124, the sensor device 604 of FIG. 6, the CPU 704, or a combination thereof. The mixed ambisonic data may include or correspond to the mixed ambisonic data 125 of FIG. 1.

The method 1000 also includes performing an adjustment operation on the mixed ambisonic data based on position data to generate an adjusted mixed ambisonic output, at 1104. For example, the position data may include or correspond to the position data 110, the coordinate data 120, the orientation data 122, the position data 410, the orientation data 420, the translation data 421, or a combination thereof. The adjustment operation may be performed by the processor 104, the ambisonic adjustment circuitry 130, the sensor device 604 of FIG. 6, the CPU 704, a rotator, a translator, or a combination thereof. The adjusted mixed ambisonic output may include or correspond to the adjusted mixed ambisonic output 131 of FIG. 1.

In some implementations, the method 1000 may include receiving a first ambisonic signal and a second ambisonic signal. The first ambisonic signal corresponds to the first ambisonic data and the second ambisonic signal corresponds to the second ambisonic data. The method 1000 may further include receiving the position data. For example, the position data may be received from a control device, a headset, a position sensor, an orientation sensor, a camera, or a combination thereof.

In some implementations, the method 1000 includes generating an adjustment matrix based on the position data. The adjustment matrix may include rotation coefficients, translation coefficients, or a combination thereof. The adjustment operation may be performed using the adjustment matrix to generate the adjusted mixed ambisonic output. The adjustment operation may include a rotation operation, a translation operation, or a combination thereof.

The method 1000 may include, prior to generating the mixed ambisonic data, adjusting the first ambisonic data based on ambisonic input movement data associated with the first ambisonic data. Additionally, or alternatively, the method 1000 may include, prior to mixing the first ambisonic data and the second ambisonic data, performing a first gain compensation operation on the first ambisonic data. The first gain compensation operation may be based on a spatial order of the first ambisonic data. The first gain compensation operation may cause a gain of the first ambisonic data to substantially match a gain of the second ambisonic data.

In a particular implementation, the first ambisonic data corresponds to a first spatial order, and each of the second ambisonic data and the mixed ambisonic data correspond to a fourth spatial order. In another particular implementation, the first ambisonic data corresponds to a fourth spatial order. In other implementations, the first ambisonic data may correspond to a fifth or higher spatial order. In other examples, the first ambisonic data corresponds to a higher spatial order than the second ambisonic data.

In some implementations, to generate the mixed ambisonic data, the method 1000 may further include mixing third ambisonic data with the first ambisonic data and the second ambisonic data. In some implementations, the method 1000 may include mixing eight or more ambisonic inputs to generate the mixed ambisonic data. For example, a first ambisonic input may correspond to the first ambisonic data and a second ambisonic input may correspond to the second ambisonic data.

In some implementations, the method 1000 may include generating a spatialized audio signal (e.g., the output spatialized audio signal 148) based on the adjusted mixed ambisonic output. In some implementations, the spatialized audio signal is formatted in accordance with a binaural format. In a particular implementation, the spatialized audio signal is formatted in accordance with a higher order ambisonic (HOA) format. In other implementations, the spatialized audio signal is formatted in accordance with an audio channel format or an audio object-based format.

In a particular implementation, the method 1000 may further include initiating display of a graphical user interface (GUI). The GUI may indicate local ambisonic data stored at a memory, one or more modification operations associated with the local ambisonic data, one or more mixing operations, or a combination thereof. For example, the processor 104 may initiate display of the GUI 900 via the display device 142, the display device 422, the projection device 602, the display device 708, or the display device 854. The method 1000 may further include controlling playback of an ambisonic output. Controlling playback may include pausing or resuming playback.

The method 1000 may enable processing of spatialized audio signals using fewer processing resources than other techniques. For example, mixing ambisonic data prior to performing an adjustment operation may reduce the number of adjustment operations performed (or may reduce the complexity of the adjustment operations), which uses fewer processing resources than adjusting each set of ambisonic data individually prior to mixing. The disclosed techniques enable processing of spatialized audio signals using devices that would otherwise lack sufficient processing resources to process spatialized audio signals. Thus, multimedia applications, such as virtual reality (VR) applications and augmented reality (AR) applications, may be enabled on a wider variety of devices, such as mobile devices and vehicles (e.g., smart cars, autonomous vehicles, etc.).

Figure 11:
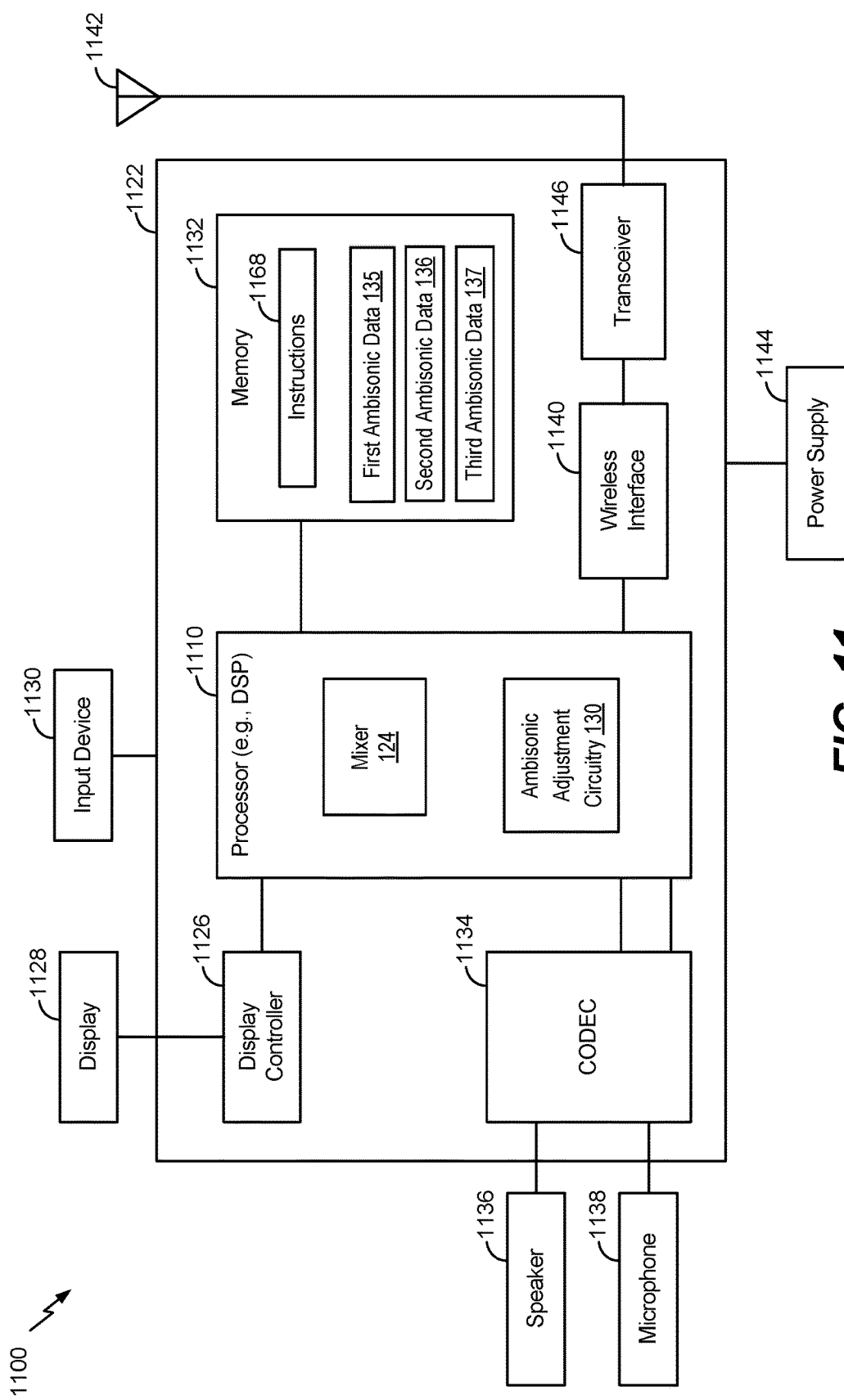
FIG. 11 is a block diagram of a particular illustrative example of a mobile device that is operable to perform multi-input ambisonic processing as described with reference to FIGS. 1-10.

Referring to FIG. 11, a block diagram of a particular illustrative implementation of a device (e.g., a wireless communication device) is depicted and generally designated 1100. In various implementations, the device 1100 may have more components or fewer components than illustrated in FIG. 11.

In a particular implementation, the device 1100 includes a processor 1110, such as a central processing unit (CPU) or a digital signal processor (DSP), coupled to a memory 1132. The processor 1110 may include or correspond to the processor 104 of FIGS. 1, 4, and 5, the sensor device 604 of FIG. 6, the CPU 704 of FIG. 7, or a combination thereof. The processor 1110 includes the mixer 124 and the ambisonic adjustment circuitry 130. In some implementations, the processor 1110 further includes the adjustment matrix generation circuitry 128, the renderer 126, or both. The memory 1132 may include or correspond to the memory 106 of FIG. 1.

The memory 1132 includes instructions 1168 (e.g., executable instructions) such as computer-readable instructions or processor-readable instructions. The instructions 1168 may include one or more instructions that are executable by a computer, such as the processor 1110. The memory 1132 further includes the first ambisonic data 135, the second ambisonic data 136, and the third ambisonic data 137. In some implementations, the memory 1132 stores local ambisonic data in addition to (or instead of) the ambisonic data 135-137.

FIG. 11 also illustrates a display controller 1126 that is coupled to the processor 1110 and to a display 1128 (e.g., a display device). The display 1128 may include or correspond to the input/output device 114, the display device 142, the output device 140, the display device 422, the projection device 602, the display device 708, the display device 854 of FIG. 8, or a combination thereof. A coder/decoder (CODEC) 1134 may also be coupled to the processor 1110. A speaker 1136 and a microphone 1138 may be coupled to the CODEC 1134. The speaker 1136 may include or correspond to the input/output device 114, the transducers 144, the output device 140, the transducers 424, the audio device 502, the speaker array 606, the plurality of speakers 722, 724, 726, 728, or a combination thereof.

FIG. 11 further illustrates that a wireless interface 1140, such as a wireless controller, and a transceiver 1146 may be coupled to the processor 1110 and to an antenna 1142, such that wireless data received via the antenna 1142, the transceiver 1146, and the wireless interface 1140 may be provided to the processor 1110. The wireless interface 1140 may include or correspond to the wireless interface 470. In some implementations, the processor 1110, the display controller 1126, the memory 1132, the CODEC 1134, the wireless interface 1140, and the transceiver 1146 are included in a system-in-package or system-on-chip device 1122. In some implementations, an input device 1130 and a power supply 1144 are coupled to the system-on-chip device 1122. The input device 1130 may include or correspond to the sensor device 102, the input/output device 114, the display device 142, the input device 402, the sensor device 604, the input device 706, the input device 852 of FIG. 8, or a combination thereof. Moreover, in a particular implementation, as illustrated in FIG. 11, the display 1128, the input device 1130, the speaker 1136, the microphone 1138, the antenna 1142, and the power supply 1144 are external to the system-on-chip device 1122. In a particular implementation, each of the display 1128, the input device 1130, the speaker 1136, the microphone 1138, the antenna 1142, and the power supply 1144 may be coupled to a component of the system-on-chip device 1122, such as an interface or a controller.

The device 1100 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 1132 may include or correspond to a non-transitory computer readable medium storing the instructions 1168. The instructions 1168 may include one or more instructions that are executable by a computer, such as the processor 1110. The instructions 1168 may cause the processor 1110 to perform one or more operations described herein, including, but not limited to, one or more portions of the method 1000 of FIG. 10. For example, the memory 1132 may include or correspond to a non-transitory computer readable medium storing instructions that, when executed by a processor, cause the processor to mix first ambisonic data and second ambisonic data to generate mixed ambisonic data and to perform an adjustment operation on the mixed ambisonic data based on position data to generate an adjusted mixed ambisonic output.

In some implementations, device 1100 is configured to be communicatively coupled with a base station that is included in a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

Various functions may be performed by one or more components of the base station, such as sending and receiving messages and data (e.g., audio data). The one or more components of the base station may include a processor (e.g., a CPU), a transcoder, a memory, a network connection, a media gateway, a demodulator, a transmission data processor, a receiver data processor, a transmission multiple input-multiple output (MIMO) processor, transmitters and receivers (e.g., transceivers), an array of antennas, or a combination thereof. One or more of the components of the base station may be configured to process multi-input ambisonic data, as described with reference to FIGS. 1-11, and to communicate an output spatialized audio signal, such as the mixed ambisonic data 125, the adjusted mixed ambisonic output 131, the output spatialized audio signal 148, or a combination thereof, to the device 1100.

In conjunction with the described aspects, an apparatus includes means for mixing first ambisonic data and second ambisonic data to generate a mixed ambisonic input. The first ambisonic data and the second ambisonic data correspond to different spatial orders. The means for mixing may include or correspond to the sensor device 102, the processor 104, the mixer 124, the sensor device 604 of FIG. 6, the CPU 704, the processor 1110 configured to execute the instructions 1168 stored in the memory 1132, one or more other structures or circuits configured to mix the first ambisonic data and the second ambisonic data, or any combination thereof.

The apparatus includes means for adjusting the mixed ambisonic data based on position data to generate an adjusted mixed ambisonic output. The means for adjusting may include or correspond to the sensor device 102, the processor 104, the ambisonic adjustment circuitry 130, the sensor device 604 of FIG. 6, the CPU 704 of FIG. 7, the interactive processing and ambisonic adjustment circuitry 806 of FIG. 8, a rotator, a translator, the processor 1110 configured to execute the instructions 1168 stored in the memory 1132, one or more other structures or circuits configured to perform the adjustment operation, or any combination thereof.

In a particular implementation, the means for mixing and the means for adjusting are integrated in a head-mountable device. For example, the means for mixing and the means for adjusting may be integrated in one or more processors of a head-mountable device. In another particular implementation, the means for mixing and the means for adjusting are integrated in a mobile communication device.

One or more of the disclosed aspects may be implemented in a system or an apparatus, such as the device 1100, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1100 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-11 may illustrate systems, apparatuses, or methods according to the teachings of the disclosure, the disclosure is not limited to these illustrated systems, apparatuses, or methods. One or more functions or components of any of FIGS. 1-11 as illustrated or described herein may be combined with one or more other portions of another of FIGS. 1-11. Accordingly, no single implementation described herein should be construed as limiting and implementations of the disclosure may be suitably combined without departing form the teachings of the disclosure.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, HOA audio format, on-device rendering, consumer audio, TV and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV and accessories, and the car audio systems. In other words, the single representation of the audio content may be played back at a generic audio playback system (i.e., as opposed to requiring a particular configuration such as 5.1, 7.1, etc.), such as any of the above-described audio playback systems.

Other examples of context in which the techniques may be performed include an audio ecosystem that may include acquisition elements and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into the HOA coefficients for playback by one or more of the playback elements. For instance, a user of the mobile device may record (acquire a soundfield of) a live event (e.g., a meeting, a conference, a play, a concert, etc.), and code the recording into HOA coefficients.

The mobile device may also utilize one or more of the playback elements to playback the HOA coded soundfield. For instance, the mobile device may decode the HOA coded soundfield and output a signal to one or more of the playback elements that causes the one or more of the playback elements to recreate the soundfield. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D soundfield and playback the same 3D soundfield at a later time. In some examples, the mobile device may acquire a 3D soundfield, encode the 3D soundfield into HOA, and transmit the encoded 3D soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a soundfield for playback by the delivery systems.

The techniques may also be performed with respect to exemplary audio acquisition devices. For example, the techniques may be performed with respect to an Eigen microphone which may include a plurality of microphones that are collectively configured to record a 3D soundfield. In some examples, the plurality of microphones of the Eigen microphone may be located on the surface of a substantially spherical ball with a radius of approximately 4 cm. Another exemplary audio acquisition context may include a production truck which may be configured to receive a signal from one or more microphones, such as one or more Eigen microphones.

The mobile device may also, in some instances, include a plurality of microphones that are collectively configured to record a 3D soundfield. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a renderer to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a renderer to compensate with the other 6 speakers such that playback may be achieved on a 6.1 speaker playback environment.

Moreover, a user may watch a sports game while wearing headphones. In accordance with one or more techniques of this disclosure, the 3D soundfield of the sports game may be acquired (e.g., one or more Eigen microphones may be placed in and/or around a baseball stadium), HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones) and render the reconstructed 3D soundfield into signals that cause the headphones to output a representation of the 3D soundfield of the sports game.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
   a sound field adjuster configured to adjust, based on particular data, particular ambisonic data to generate first ambisonic data, wherein the particular data represents movement, relative to a listener, of a first sound source associated with a first sound represented by the first ambisonic data;
   a mixer configured to mix the first ambisonic data and second ambisonic data to generate mixed ambisonic data, wherein the second ambisonic data represents a second sound associated with a second sound source that is stationary relative to the listener, and wherein the first ambisonic data and the second ambisonic data correspond to different spatial orders; and
   ambisonic adjustment circuitry configured to adjust the mixed ambisonic data based on position data to generate an adjusted mixed ambisonic output, wherein the position data is independent of the particular data.

2. The device of claim 1, further comprising adjustment matrix generation circuitry configured to generate an adjustment matrix based on the position data, wherein the ambisonic adjustment circuitry is further configured to perform an adjustment operation using the adjustment matrix to generate the adjusted mixed ambisonic output, and wherein the adjustment matrix includes rotation coefficients, translation coefficients, or a combination thereof.

3. The device of claim 1, wherein the mixer is further configured to mix third ambisonic data with the first ambisonic data and the second ambisonic data to generate the mixed ambisonic data.

4. The device of claim 1, wherein the mixer is configured to mix eight or more ambisonic inputs to generate the mixed ambisonic data, wherein the first ambisonic data corresponds to a first ambisonic input, and wherein the second ambisonic data corresponds to a second ambisonic input.

5. The device of claim 1, further comprising a processor, wherein the processor includes the mixer and the ambisonic adjustment circuitry, and wherein the processor is integrated in a wearable multimedia display device or a mobile communication device.

6. The device of claim 5, further comprising:
   a memory coupled to the processor and configured to store local ambisonic data; and
   a user interface device configured to receive an input, wherein the processor is further configured to modify the local ambisonic data or replace the local ambisonic data based on the input.

7. The device of claim 6, wherein the mixer is further configured to mix the local ambisonic data with the first ambisonic data and the second ambisonic data to generate the mixed ambisonic data.

8. The device of claim 6, wherein the processor is further configured to modify the adjusted mixed ambisonic output based on a user command received via the user interface device.

9. The device of claim 1, further comprising a renderer configured to receive the adjusted mixed ambisonic output and to generate a spatialized audio signal.

10. The device of claim 9, further comprising an audio output port coupled to the renderer and configured to receive the spatialized audio signal and to be coupled to an external audio output device.

11. The device of claim 9, further comprising a display device coupled to the renderer and configured to display content associated with a multimedia program, wherein the spatialized audio signal represents audio content associated with the multimedia program.

12. The device of claim 9, wherein the spatialized audio signal is formatted in accordance with a higher order ambisonic (HOA) format.

13. The device of claim 9, wherein the spatialized audio signal is formatted in accordance with an audio channel format, an audio object-based format, or a binaural format.

14. The device of claim 9, further comprising at least two speakers configured to generate an audio output representation of the spatialized audio signal.

15. The device of claim 1, wherein the mixer includes:
   a first mixer configured to perform a first mixing operation based on first order components of the first ambisonic data and further based on first order components of the second ambisonic data; and
   a second mixer configured to perform a second mixing operation based on second order components of the second ambisonic data.

16. The device of claim 1, further comprising adjustment matrix circuitry coupled to the ambisonic adjustment circuitry and configured to generate an adjustment matrix based on the position data, wherein the ambisonic adjustment circuitry is configured to perform an ambisonic adjustment operation using the adjustment matrix to generate the adjusted mixed ambisonic output, and wherein the adjustment matrix has a number of rows and a number of columns that correspond to a spatial order of the mixed ambisonic data and is selected, based on the position data, from among a plurality of adjustment matrices stored at a memory.

17. A method of audio processing, the method comprising:
adjusting, by a sound field adjuster and based on particular data, particular ambisonic data to generate first ambisonic data, wherein the particular data represents movement, relative to a listener, of a first sound source associated with a first sound represented by the first ambisonic data;
mixing the first ambisonic data and second ambisonic data to generate mixed ambisonic data, wherein the second ambisonic data represents a second sound associated with a second sound source that is stationary relative to the listener, and wherein the first ambisonic data and the second ambisonic data correspond to different spatial orders; and
performing an adjustment operation on the mixed ambisonic data based on position data to generate an adjusted mixed ambisonic output, wherein the position data is independent of the particular data.

18. The method of claim 17, further comprising receiving a first ambisonic signal and a second ambisonic signal, wherein the first ambisonic signal corresponds to the first ambisonic data and the second ambisonic signal corresponds to the second ambisonic data, and wherein the adjustment operation comprises a rotation operation, a translation operation, or a combination thereof.

19. The method of claim 18, further comprising initiating display of a graphical user interface (GUI), the GUI indicating local ambisonic data stored at a memory, one or more modification operations associated with the local ambisonic data, one or more mixing operations, or a combination thereof.

20. The method of claim 19, further comprising controlling playback of an ambisonic output, wherein controlling playback comprises pausing or resuming playback.

21. The method of claim 17, further comprising receiving the position data from a control device, a headset, a position sensor, an orientation sensor, a camera, or a combination thereof.

22. The method of claim 17, further comprising, prior to mixing the first ambisonic data and the second ambisonic data, performing a first gain compensation operation on the first ambisonic data, wherein the first gain compensation operation is based on a spatial order of the first ambisonic data.

23. An apparatus comprising:
means for adjusting, based on particular data, particular ambisonic data to generate first ambisonic data, wherein the particular data represents movement relative to a listener, of a first sound source associated with a first sound represented by the first ambisonic data;
means for mixing the first ambisonic data and second ambisonic data to generate mixed ambisonic data, wherein the second ambisonic data represents a second sound associated with a second sound source that is stationary relative to the listener, and wherein the first ambisonic data and the second ambisonic data correspond to different spatial orders; and
means for adjusting the mixed ambisonic data based on position data to generate an adjusted mixed ambisonic output, wherein the position data is independent of the particular data.

24. The apparatus of claim 23, wherein the means for mixing and the means for adjusting are integrated in a head-mountable device.

25. The apparatus of claim 23, wherein the means for mixing and the means for adjusting are integrated in a mobile communication device.

26. A non-transitory computer readable medium storing instructions that, when executed by a processor, cause the processor to:
adjust, based on particular data, particular ambisonic data to generate, independently of position data, first ambisonic data, wherein the particular data represents movement relative to a listener of a first sound source associated with a first sound represented by the first ambisonic data;
mix the first ambisonic data and second ambisonic data to generate mixed ambisonic data, wherein the second ambisonic data represents a second sound associated with a second sound source that is stationary relative to the listener, and wherein the first ambisonic data and the second ambisonic data correspond to different spatial orders; and
perform an adjustment operation on the mixed ambisonic data based on position data to generate an adjusted mixed ambisonic output, wherein the position data is independent of the particular data.

27. The non-transitory computer readable medium of claim 26, wherein the first ambisonic data corresponds to a first spatial order, and wherein each of the second ambisonic data and the mixed ambisonic data correspond to a fourth spatial order.

28. The non-transitory computer readable medium of claim 26, wherein the first ambisonic data corresponds to a fifth or higher spatial order.

29. The non-transitory computer readable medium of claim 26, wherein the first ambisonic data corresponds to a higher spatial order than the second ambisonic data.

* * * * *